United States Patent Office 3,232,925
Patented Feb. 1, 1966

3,232,925
SULFONATED LIGNIN-CONTAINING PRODUCT AND PRODUCTION THEREOF
Ellis Gray King and Carl Adolphson, Bellingham, Wash., assignors to Georgia-Pacific Corporation, Portland, Oreg., a corporation of Georgia
No Drawing. Filed Mar. 31, 1960, Ser. No. 18,887
35 Claims. (Cl. 260—124)

This application is a continuation-in-part of our copending application Serial No. 433,794, filed June 1, 1954, now abandoned, entitled "Process of Improving the Effectiveness of the Components of Spent Sulfite Liquor and the Products Thereof"; our copending application Serial No. 539,542, filed October 10, 1955, entitled "Process of Improving the Effectiveness of the Components of Spent Sulfite Liquor and the Products Thereof," now Patent No. 2,935,504; our copending application Serial No. 769,185, filed October 23, 1958, now Patent No. 3,171,810, entitled "Process for Providing an Improved Drilling Fluid and the Product Thereof"; our copending application Serial No. 789,775, filed January 29, 1959, now abandoned, entitled "Process for Providing an Improved Drilling Mud of Clay and a Metal Lignosulfonate and the Product Thereof"; our copending application Serial No. 806,974, filed April 16, 1959, now abandoned, entitled "Improved Gypsum Base Drilling Fluid and the Products Thereof"; and our copending application Serial No. 815,294, filed May 25, 1959, entitled "Drilling Fluid Composition and Process," now Patent No. 2,935,473.

Our invention and discovery relates to improvements in drilling fluids resulting from a novel combination of clays and specially treated sulfonated lignin-containing material, and has reference to processes for preparing said material and to the material per se.

More particularly our invention relates to an improved drilling fluid or mud composition or combination, to a process for use thereof, to processes for the production of novel sulfonated lignin-containing material, and to the products of such processes. This mud combination may be formulated to function as water base drilling muds, for example and not limitation as fresh water mud, as lime base mud, as gypsum mud, as calcium chloride mud, as salt contaminated or sea water muds, and in emulsion mud systems. Furthermore, the mud combination is usable over the entire pH range of drilling mud fluids used in the field. A particularly novel form of our mud system is the combination with gypsum which is especially useful in drilling oil wells when anhydrite is encountered. Heretofore, a well recognized fact is that sulfonated lignin-containing additives such as those derived from spent sulfite liquor are effective as thinners in lime base muds but such are not useful as thinners in fresh water muds.

Moreover, our improved mud combination is characterized by stability to high temperature and by effectiveness in resisting the deteriorating effects of contaminants encountered in drilling. Such effectiveness is particularly advantageous in drilling deep wells where high temperature and pressure exists.

Our invention and discovery herein relates primarily and fundamentally to the providing of a novel combination of drilling mud clay and sulfonated lignin-containing material whereby there results drilling muds of newly found properties. It would be difficult to find a more sensitive test of the increased effectiveness of the components of our invention than those required to meet the properties of said drilling muds.

The improved effectiveness of the components of the sulfonated lignin-containing material provided by our invention and discovery renders them suitable as a drilling mud additive, or as the base from which an improved drilling mud can be formed, which mud is characterized by having greatly improved properties.

The methods of treating sulfonated lignin-containing material through oxidation and salt formation in improving the dispersive properties of said sulfonated lignin-containing material and the combination of said additive products with clay and water in forming drilling muds are completely disclosed in said copending applications. Furthermore the unexpected resistance of such muds to the contaminants encountered in oil well drilling was also set forth.

The outstanding properties of suitable magnitude which characterize a useable and practical drilling mud comprise the following: (1) initial gel strength; (2) viscosity; (3) 10-minute gel strength; and (4) water loss, which relates to the sealing off of the wall of the drilling hole by building up a filter cake of mud on the wall, thus preventing loss of water from the mud. Thus, it is manifest that the drilling mud, with its exacting requirements of various properties for the mud, is a most important, involved, and complex feature of oil and gas well drilling.

Our invention and discovery is characterized by making it possible to greatly improve the effectiveness of the components of said sulfonated lignin-containing material with very simple and inexpensive equipment. The simplicity of the treatment of our invention and discovery is one of its outstanding features.

One important property of drilling mud is that in case of temporary stoppage of work, the mud should "gel" sufficiently to prevent settling of the suspended cuttings, which settled cuttings would "seize" the drill stem and prevent re-starting or its withdrawal from the well. From this it is manifest that the viscosity of the fluid is highly important. Likewise, the property to gel or to set like gelatin is important when the agitation incident to drilling ceases. Thus, the mud will hold in suspension the cuttings and at the same time become fluid when agitation is resumed. This is called the "thixotropic" property of the fluid, or its gel strength. Most clays have this property but not all. Such property may be increased by adding the clay called bentonite and similar substances. As the drilling proceeds through different strata, the viscosity and gel strength may be affected by the character of the strata, by the loss by absorption of water in the porous strata or in the inflow of water and other fluids, by temperature changes, or by chemically active substances which may enter the drilling fluid as the drilling proceeds. Accordingly, viscosity, gel and water loss are very carefully watched and corrected from time to time during the drilling. There are instruments provided for testing such properties at the mouth of the well.

It is one of the fundamental objects and purposes of this invention and discovery to provide a drilling fluid containing an inexpensive and highly effective mud additive to overcome the problems that have existed for so long in this field. Let it always be kept in mind that the value of the drilling mud depends on how much it will contribute to speed, efficiency, and safety in oil and gas well drilling. Our invention and discovery provides a combination of clay and treated sulfonated lignin-containing material, which combination is characterized by its economy as well as its very special effectiveness, not only for one of the two primary recognized types of drilling muds, i.e., "lime base" and "fresh water" muds, but for the special effectiveness of both of said types of mud.

An important and fundamental object of our invention is to provide a gypsum base mud characterized by a low gel rate rather than the usual objectionable high gel rate which is usually accompanied by high flat gels. Such muds accomplish the maintaining of suitable gels so that cuttings fall out in the mud pit without the necessity of watering back to thin the mud. In this way, the need for costly water loss reducing agents such as carboxy-methylcellulose is substantially lessened, if not eliminated, and the amount of expensive weighting agents required for deep wells is decreased.

It is the primary and fundamental purpose of our invention and discovery to provide a drilling mud system or combination of clay and sulfonated lignin containing material which will operate in controlling the colloidal and physical properties and for maintaining the required properties of a water-clay drilling mud which may be subject to contaminants, so that the mud combination will function in a more effective and more economical manner than heretofore. Thus, an important part of our invention is the rendering more effective the properties of the sulfonated lignin containing materials and herein resides protection against contamination.

This part of our invention relating to the sulfonated lignin containing materials is commonly referred to as the drilling mud additive. Our purpose is to provide such an additive of a character which will function as a control product for the colloidal and physical properties and for maintaining the required properties of the water clay drilling mud which may become subject to contaminants in the drilling operation and to provide such an additive when combined with the mud that will function in a more efficient and more economical manner than has been accomplished heretofore.

The part of our invention and discovery which relates to a further improvement in lessening water loss of gypsum contaminated muds involves the addition of sodium sulfate or equivalents as hereinafter listed to the combination of clayey material and the additive lignosulfonate product of our invention and discovery, in the proportion of 1% to 100% of said sodium sulfate or equivalents by weight of the additive lignosulfonate product, said addition being made in proportions determined by a pilot test of a drilling mud which is contaminated with calcium sulfate. The additive product of our invention in and of itself may not produce the extremely low water losses desired in some muds. The addition of the sodium sulfate and equivalents as hereinafter listed will further reduce the water loss to the desired level and at the same time said additive product prevents the large rise in viscosity and gel factors which occur when sodium sulfate alone is added to an aqueous suspension of clayey material. Thus in the presence of the additive lignosulfonate product, the ordinary adverse action of the sodium sulfate is depressed.

Sometimes the formations are of thick dolomitic lime or other rock sections which do not contribute good mud making materials. In such cases it is necessary to control or maintain the mud by addition daily of bentonite to develop the desired low fluid loss, and the pH of the mud is maintained on the alkaline side to promote hydration and dispersion of the drilled shales. The alkaline pH promotes higher viscosities, in the bentonite clays, and, therefore, thinners are added and those with alkaline properties such as the sodium tannate type are preferred. These thinners, because of the presence of alkaline sodium salt, aid in the formation of sodium clays from the dispersed shales and also increase the degree of dispersion of the clays and shales and hence reduce the fluid loss to strata surrounding the hole. In general, the pH or alkalinity of such muds is maintained at about 9.0 or 10.0. At times the pH of the mud rises or is carried to the range of 10.5 to 11.5 in which the clays and bentonite present manifest appreciably higher viscosity. The treatment of these muds is with sodium hydroxide and quebracho (sodium tannate) and they are referred to as "red muds." In all of these cases, the principal contaminants are salt, cement, gypsum or anhydrite, sand, and other inert mineral matter.

When the mud viscosity becomes too high, it may be more economical to convert to the so-called lime base mud rather than to dilute with water involving the necessary addition of weighting material. At other times, the contamination becomes so bad that the chemicals are not effective and it is found necessary to convert to the lime base mud. This conversion involves the addition of an excess of lime and caustic together with a thinner such as quebracho or, preferably, lignosulfonates. This type of high pH mud with an excess of lime is hereinafter referred to as a "lime base mud" as contrasted to all of the other water clay muds previously discussed, which for convenience will be hereinafter termed "fresh water muds."

OBJECTS

In general, quebracho, as a thinner, has been used in all types of muds, both fresh water and lime base, but quebracho is an expensive commodity. Prior to the date of the invention disclosed in said copending application, Serial No. 433,794, the lignosulfonates had been useful only in lime base muds where they are well known to be relatively inexpensive, but until said invention it had not been possible to use the lignosulfonates in the lower pH (less than 12, i.e., fresh water) muds not containing an excess of lime, inasmuch as they have no appreciable thinning action on such muds. One of the primary objects of this invention is to provide a drilling fluid composition containing an additive comprising a selected fraction of a soluble sulfonated lignin-containing material which is highly effective, not only as lime base muds, but also as fresh water type muds.

A primary and fundamental object is to provide a drilling fluid dispersing agent derived from fractionated spent wood pulping liquor solids in the simplest and most economical manner with relatively inexpensive equipment, and in a continuous manner to produce from these said liquor solids a soluble additive for drilling mud systems or combinations which is effective in reducing the viscosity and gels of both fresh water muds and the so-called lime base muds, even in the presence of substantial quantities of natural contaminants such as anhydrite, sodium chloride and sodium sulphate.

Another objective is to provide by a sequence of steps a drilling fluid additive derived from spent wood pulping liquors which are preferably initially purified and then fractionated and modified to obtain a soluble additive for making the mud combination of our invention which is characterized by the fact that molecules of each fraction are of a particular and different molecular average size and especially useful for dispersing agents in general and additives for drilling muds in particular.

Another primary object of our invention is to provide a drilling fluid additive produced by preparing and fractionating chlorinated lignosulfonates to provide said chlorolignosulfonates in fractions of specific molecular weight to adapt the same to a particular purpose. It is particularly the object of this invention to provide drilling fluid compositions containing fractionated soluble spent sulfite liquor additives that are not only especially lower in cost, but are highly effective and useful in essentially all types of water clay and oil-in-water emulsion drilling muds.

Still another object of this invention is to provide an additive which is effective in a drilling mud which is prepared with saline or sea water when fresh water is not readily available. Mud prepared with sea water has special utility in off-shore drilling where fresh water must be transported to the drilling site and fresh water muds must be protected from sea water contamination. We have found that the additive of our invention is surprisingly effective as a thinner not only for gypsum base muds, but also for saline muds made up originally with sea water as the aqueous component together with commercial mud clays.

DEFINING STARTING MATERIALS

Spent lignin liquors from the pulping of wood provide an inexpensive source of the raw material for our process and product, the said liquors being available in large quantity as waste products of the pulping processes. One of our aims is to conserve this waste material.

The preferred raw material is derived from the pulping of wood by the calcium bisulfite process for the manufacture of pulp. In this operation a substantial portion (20% to 70%, usually about 55%) of the wood is converted to water soluble products which at the end of the cooking process are separated from the pulp in water solution. This solution, because of the washings, is very dilute, ranging approximately from 5% to 20% solids. This solution can be used as such in our process or it can be concentrated in any one of several well known ways to a more concentrated solution which is more readily and economically handled, particularly because of the smaller volume of liquid involved. The concentrated solution can range from 30% to 70%, but handles better in the range of 40 to 50% total solids in solution. This concentrated solution contains lignosulfonates as salts (for example calcium, magnesium, sodium, or ammonium salts, depending on which of these are employed in the digesting process), carbohydrates, and other complex organic compounds derived from wood, as well as inorganic compounds either present in the wood or derived from the reaction. Furthermore, digesting of wood by iron or aluminum bisulfite will give a spent sulfite liquor component which may be our raw material and which will obviate the necessity of a base exchange reaction to form the iron or aluminum salts. The concentrated solution may be used in our invention and it is very desirable to do so. However, the spent sulfite liquor can be further refined before or after processing according to our invention. For example, the spent sulfite liquor can be essentially freed of carbohydrate material by any one of a number of procedures, preferably by fermentation. Also, said carbohydrates may be removed by dialysis, by separation with organic solvents or organic bases, or by precipitation as basic lignosulfonates, for example, with lime or by salting out with salts such as calcium chloride or sodium chloride. In addition, the lignosulfonates, as well as being freed as far as possible of extraneous materials, are fractionated as to molecular weight components.

Any of these above described products are basically derived from spent sulfite liquor solids, and are sulfonated lignin-containing materials and the degree of refining to which they are subjected either before or after the steps of our invention will depend on the quality of product desired and the economics involved. That is, refining to some extent will improve the properties of the final processed product, but the degree of improvement will not always be economically justifiable.

In general, any type of wood or lignocellulosic material, the same including straw, cornstalks, bagasse and the like, which can be resolved to pulp with the separation of the lignin-containing material, may be used as a source for providing lignosulfonate in following our invention. Furthermore, changes in the final properties of the product are influenced by the conditions of the pulping process, but in general good results are obtained using the commercial spent sulfite liquor from either paper grade quality pulp or dissolving grade quality pulp.

In addition to the spent sulfite liquor derived from the acid bisulfite pulping of wood, liquors containing soluble lignin are also available from the neutral and alkaline pulping of wood or other lignocellulosic material. Such lignin-containing materials may be converted to sulfonated lignin-containing materials usable as raw materials for the process of our invention, for instance by treatment with sulfites at elevated temperatures, chlorination and heating with sodium sulfite or by other methods known to those skilled in the art, subject only to getting a soluble sulfonated lignin or one which tends to dissolve in water and which on forming the metallic salt and being oxidized is soluble. For example and not by way of limitation, sulfonated Kraft lignin has been found to perform well in making the oxidized metallic salts of sulfonated lignin according to our disclosure. This is also true of sulfonated soda lignin.

In deriving sulfonated lignin containing material from wood pulping liquors varying degrees of sulfonated lignin-containing material result, depending on the well known range of conditions involved in the different methods of sulfonation. For practicing our invention the resulting sulfonated raw material should be soluble in water or in highly alkaline aqueous media and should have dispersing properties. These characteristics are in part associated with the degree of sulfonation, or the proportion of sulfonic acid groups which have entered the lignin molecule during the sulfonation process. The chemical formula for sulfonic acid groups is —$SO_3H$, in which the sulfur atom is combined directly with a carbon atom in the lignin or other organic material in the lignin-containing material sulfonated.

This type of sulfur is to be distinguished from inorganic sulfates or sulfites, sulfur dioxide free or loosely combined with the lignin and sulfur which might be bound with the lignin as a sulfate. The sulfonate sulfur or sulfur combined directly with carbon is a stably bound sulfur which is not removed from the lignin without drastic treatment such as with sodium hydroxide at high temperature and pressure. In speaking of the sulfur content of the sulfonated lignin-containing material, we refer to the total sulfur as the sulfur of all types which are determined by standard analytical procedures and to the sulfonate sulfur which is the sulfur stably bound with the lignin. The degree of sulfonation required to promote solubility and dispersive properties will vary somewhat with the source of the lignin being sulfonated, i.e., the conditions of pulping. However, sulfonated lignin, having sulfonate sulfur contents as low as those in the range 0.9–3.8% have been used successfully in making the dispersive additives of our invention. Products containing sulfonate sulfur in excess of these amounts do, of course, have the requisite solubility for use in accordance with the present invention.

By way of summary, the raw material for our process is a sulfonated lignin-containing material as it may be received from the blow pit of the bisulfite process or modification of said bisulfite process employing somewhat less acidity, for example and not limitation, about pH 4.5 instead of 1.5 or less, or other sulfonated lignin-containing materials such as those derived from neutral or alkaline pulping processes. Any of these may be in any one of a number of states or degrees of refinement, purification and concentration. We prefer, however, to use concentrated and fermented spent sulfite liquor from the pulping of wood with calcium bisulfite cooking acid because such material is already sulfonated, and is easily converted to other metal salts as disclosed hereinafter and is available in large quantities. By "fermented" is meant spent liquor from which carbohydrates have been removed by fermentation. In any event our starting material comprises a sulfonated lignin-containing material.

Our starting material may be defined and is fractionated, but whether it is fractionated before or after treatment according to our invention depends on economical considerations and the special product desired.

Briefly stated, our novel compositions include additives produced by a process which in part involves converting selected fractions of sulfonated lignin-containing material to a salt of iron, chromium, copper, and aluminum, or combinations of said salts; or converting the refined fractionated sulfonated lignin-containing material to said salts; or converting to said metal salts fractionated sulfonated lignin material subjected to other pretreatments, effecting improvement in properties for use in drilling mud, for example but not by limitation, by alkaline heat pretreatment as set forth in our copending application Serial No. 694,737, filed November 6, 1957, now Patent No. 3,007,964, acid heat pretreatment, and pretreatment by steam stripping, gas or air blowing during heating of solutions of said sulfonated lignin-containing materials derived from spent wood pulping liquors. Said acid treatment may be carried out at less than about pH 4 at temperatures from 50° C. to 180° C. for times causing polymerization or thickening of the solution short of gelation, as set forth in U.S. patent application 723,036, filed December 18, 1957, now Patent No. 3,138,555, as a continuation-in-part of our U.S. patent application Serial No. 433,794, filed June 1, 1954, and Serial No. 539,542, filed October 10, 1955, now Patent No. 2,935,504. At higher pH, heating may be conducted at temperatures of 170° C. to 210° C. to bring about similar polymerization or thickening of the solution short of gelation.

Also, liquor containing the said metallic salts of dissolved fractionated components may be subjected to oxidation which brings about changes in the constitution of the fractionated solids of the sulfonated lignin-containing materials resulting also in additives of greatly enhanced properties comparable and superior to those of natural quebracho in making drilling muds. Our products are also superior in dispersing the ingredients of clay slips, cement, plaster, etc.

Another feature of the present invention comprises the use of drilling fluid additives prepared by a process which involves the oxidation of fractionated sulfonated lignin-containing material, regardless of whether the salt of iron, chromium, copper and/or aluminum is formed. We have found that such oxidized materials make substantial improvements in the effectiveness of thinning of lime base drilling muds. However, said products also provide substantial improvement, although to a lesser degree than is provided by combining oxidation with salt formation, in the case of fresh water drilling muds.

In making the salts of iron, aluminum, copper, or chromium of fractionated sulfite liquor which, for the production of an oxidized salt, can be done either before or after oxidation, we prefer to use the sulfates of these elements for this purpose because with calcium base sulfite liquor, calcium sulfate precipitates so that it may be removed and thereby bring about purification of the product. Higher temperature promotes the growth of larger crystals of calcium sulfate which are easier to separate from the liquor, hence it is desirable to hold the liquor after addition of the sulfate at 90°–95° C. for a period of time. The formation of large crystals is also fostered by bringing about the interaction of the salt with the spent sulfite liquor solids in such a manner that the precipitation of the calcium sulfate occurs more slowly. This objective can be accomplished by using more dilute solutions and/or using lower temperatures during the base exchange reaction. Hence, a preferred method of forming the iron, chromium, copper, and aluminum salts is to carry the reaction at 30°–50° C. and then to heat the solution with agitation to 90°–95° and hold this temperature for one hour or longer. The reaction mixture is usually acidic during this stage so that this latter treatment is also an acid treatment and has beneficial action on the properties of the spent sulfite liquor product.

Aluminum sulfate may be added preferably in proportion equivalent to the base (i.e., calcium, sodium, magnesium and ammonium) already present in the spent sulfite liquor or it can be used in smaller or greater proportions. Furthermore, aluminum sulfate may be added in anhydrous form or as any of the hydrates of commerce, such as papermakers' alum (17% $Al_2O_3$) or as $Al_2(SO_4)_3 \cdot 18H_2O$. In making the lignosulfonate salts, we have used aluminum sulfate salts in the proportion of 1% to 50% by weight of the spent sulfite liquor solids. With the other salts, i.e., iron, chromium and copper, the range of permissible addition is about the same, i.e., 1% to 50%. For example, copper requires the addition of about 30% of $CuSO_4 \cdot 5H_2O$ for complete base exchange as compared with about 26% of $Al_2(SO_4)_3 \cdot 18H_2O$ which takes into consideration the usual chemical equivalence. However, good results have been obtained in using from 15% to 30% of aluminum sulfate $(Al_2(SO_4)_3 \cdot 18H_2O)$. The same observation applies to the use of iron, chromium, and copper salts.

In addition to adding sufficient of the cations to be equivalent to approximately the base present in the sulfonated lignin-containing material, it is our unusual (and unexpected) discovery that an excess of the cation over the chemical equivalent for base exchange improves the effectiveness of the product of our invention and discovery, particularly in respect to the conditioning of fresh water mud in connection with obtaining the lowest possible values for yield value and 10 min. gel and water loss. Thus in the preparation of fresh water muds, we prefer to add an excess of a sulfate salt having a cation selected from the group: iron, aluminum, copper and chromium, or mixtures thereof. Since these salts occur as hydrates with varying amounts of water, the permissible addition of these salts to the mud is more definitely expressed as an amount of the sulfate salt equivalent to the anhydrous form of that salt. Thus in terms of the anhydrous forms, the permissible addition is about 1% to 80% by weight of the sulfonated lignin, in excess of the amount of sulfate salt necessary for the base exchange. Thus, for example, with the ferric sulfate the optimum results are obtained with a total addition of the sulfate salt of about 40% to 50% by weight of the sulfonated lignin, which, on the anhydrous basis, would be about 35% to 42% by weight. Accordingly, the excess over the amount for chemical equivalence on the anhydrous basis is about 20% to 27%. Ferrous sulfate and the sulfates of aluminum, chromium and copper perform in the same manner and the excess addition over the chemical equivalent on an anhydrous basis is also about 1% to 80%. Mixtures of these sulfate salts can be used for this purpose. Copper has the advantage of imparting antiseptic properties to the additive, to preserve the mud which may be subject to micro-biological attack, particularly so when starch is present.

In regard to the permissible addition of excess sulfate salt the disclosure above of 1 to 80% by weight of the anhydrous sulfate salt pertains to the salt and not to the oxidized salt. For the latter the permissible addition is somewhat less than 70%. Accordingly, from the standpoint of commercial practicability, as applied to both the salt and the oxidized salt, an excess of 1 to 50% of the anhydrous sulfate salt on the basis of the sulfonated lignin is preferred.

In forming the said salts of the sulfonated lignin-containing material, it is preferable to have the latter in the calcium condition, that is, as a calcium salt so that when the sulfate salts of iron, aluminum, copper and chromium are added, the base exchange reaction occurs and calcium sulfate forms which can be removed, thus yielding an essentially pure form of the desired salt.

The disclosure above relating to the permissible addition of 1 to 80% pertains particularly to sulfate salts, or any salt of said metals the anions of which form insoluble salts with calcium, for example, oxalates. However, any soluble salt of these metals could be added to a solution of the sulfonated lignin-containing material without the formation and/or removal of a precipitate. The anion in said soluble salt may be any of the common anions such as, chloride, nitrate, formate, etc., although higher concentrations of chloride ions and to a lesser extent nitrate ions become deleterious above the concentration equivalent to the base exchange capacity of the sulfonated lignin. Continuing then, when such a solution is brought to dryness, because of the ionic equilibrium in the solution, a mixture of salts is obtained. Thus, an amount of the desired lignosulfonate salt, for example, iron, would be present in the product, together with the base (sodium, magnesium ammonium, etc.) which was originally in the sulfonated lignin-containing material. This product would not be as efficient as the product in which the original base in the sulfonated lignin-containing material was removed prior or on addition of the iron salts. However, in cases where the sulfonated lignin-containing material has the base sodium, magnesium or ammonium present instead of calcium, it may be satisfactory to make the partial salt in the aforesaid manner. This could be the case, for example, with sulfonated lignin from the Kraft and soda processes which usually contains sodium as the base by reason of the steps of its manufacture.

When an excess of soluble inorganic salt (including salts such as formates and oxalates under the designation inorganic) of iron, chromium, aluminum, or copper over and above the stoichiometric equivalent of the sulfonated lignin is added in preparing the product of our invention, and the added anions are not subsequently removed, a product is obtained which is less efficient as a thinner but nevertheless is effective. The lower efficiency results from (1) dilution of the thinner by the soluble inorganic salts, and (2) a thickening of the mud resulting from the small amount of soluble inorganic salt added to the mud as a component of the thinner product. Thus, the thinner product with the excess appears to be inefficient when used in small amounts but when large amounts of said thinner product is added to the mud, the surprising resistance of the sulfonated lignin metal complex to the salt contamination overcomes the effect of the small amount of inorganic salt.

The salt contamination effect may be illustrated by considering the combination of one part of ferric chloride with 2 parts by weight of thinner additive of our invention. This combination would amount to 50% of excess of ferric chloride. Adding 9 pounds per barrel of this combination to the drilling mud gives a chloride concentration in the mud approximately equivalent to 3 pounds per barrel of sodium chloride or about 1% of said chloride and a thinner additive concentration of about 6 pounds per barrel. A mud contaminated with 1% salt (sodium chloride) is readily thinned by 6 pounds per barrel of the thinner additive.

The amount of metal for complete base exchange will depend on the concentration of acidic components in the sulfonated lignin-containing material and in particular the concentration of the sulfonated lignin. By way of example and not limitation fermented spent sulfite liquor solids having a sulfone sulfur content of about 6% will require about 5% of iron for base exchange. The addition of 50% excess anhydrous ferric sulfate over that required for base exchange is equivalent to about 14% of iron.

When magnesium, ammonium, or sodium bisulfite cooking liquor instead of calcium has been used in manufacturing the pulp, it is then desirable, but not absolutely necessary, to eliminate or partially eliminate the magnesium, ammonium, or sodium ions prior to making the iron, chromium, copper, or aluminum salt. This situation can be brought about by converting to the calcium salt before proceeding with the process of our invention, or it can be accomplished by an number of procedures well known to those skilled in the art—for example, by ion exchange, dialysis with addition of acids, and base exchange procedures in general. For example, cations (i.e., magnesium, ammonium, or sodium) may be removed by passing the liquor through a cation exchange column in the hydrogen state, and then treated with an oxide or hydroxide of iron, chromium, copper or aluminum. We prefer to have the lignosulfonate in the form of the calcium salts before making the iron, chormium, copper and aluminum salts because the salts are obtained with less contamination in this manner by reason of the calcium sulfate being precipitated so it can be removed —but note well, such purified products can be obtained by any procedure known to the art for making the conversion to the desired salt as well as those named immediately above.

An example of partial salt formation comes as a result of the oxidation treatment with sodium or potassium dichromate as a result of the fact that chromium salts are a product of the reactions involved. Any soluble chromium salts thus formed will provide chromium ions which will be in equilibrium with the calcium ions associated with the sulfonate group of the lignosulfonate. Thus, a partial chromium salt of the lignosulfonate in essence will be formed which would tend to impart the properties attained if the calcium were removed and the lignosulfonate salt were wholly chromium salts. If, furthermore, an excess over the amount of sodium dichromate necessary for the base exchange, i.e., about 12% of sodium dichromate, is added, additional chromium ions resulting from the reduction of the dichromate are present which tend to drive the reaction in the direction of the formation of the chromium salt of the lignosulfonate so that this excess would have somewhat the effect of removing the calcium or in other words, forming a chromium salt instead of the calcium salt of the lignosulfonate. The addition of excess sodium dichromate would also result in an excess of chromium salts formed by the reduction of the dichromate and would have somewhat the effect of the addition of an excess of chromium sulfate over that necessary to make the base exchange. This method of forming the salts, however, does not yield a product which is as effective for mud formulation as the methods previously described where calcium is removed, for example as the sulfate or otherwise, because calcium ions cause thickening of drilling mud and because of the miscellaneous reaction products. However, the effectiveness of agents made in this manner can be improved by removing the calcium during the treatment, for example, by adding sulfuric acid or any other acid whose anion forms insoluble salts with calcium or by addition of suitable salts which form insoluble compounds with calcium such as sodium sulfate. This illustration is mentioned by way of example that an improvement can be obtained by the presence of an excess of chromium, aluminum, copper, iron salts or combinations thereof, even though there is an equilibrium mixture present with other ions, such as potassium and sodium, but is not given to indicate a preferred method of operation.

It should be noted that an excess of sodium ions resulting from excess sodium dichromate addition is not seriously harmful since the drilling mud clays are also sodium salts and the additional sodium ions introduced into the mud by the additive are relatively few.

The iron, chromium, copper, and aluminum salts of the lignosulfonates thus formed are useful as drilling mud thinners in muds which do not contain an excess of lime, i.e., fresh water muds, and these products are thereby distinguished from the spent sulfite liquor products previoulsy used as thinners in the so-called lime base muds. These previous lignosulfonate thinners which may be ammonium, sodium, magnesium, or calcium salts of lignosulfonates are operable only in the lime base muds and are not effective in muds which are sometimes termed fresh water muds, i.e., muds of low pH and which do not contain salts of aluminum, iron, copper and chromium— the inclusion of said salts being a part of our invention and discovery. The aluminum, iron, copper, and chromium salts of the spent sulfite liquor on the other hand are effective in varying degrees over the whole pH range of the fresh water muds and are also operable as thinners in lime base muds.

Furthermore, let it be noted that another alternate pretreatment may be used whereby the hot spent sulfite liquor is acidified and air blown or treated to remove the sulfur dioxide and then oxidized with the agents described below. By this course the spent sulfite liquor is purified of sulfur dioxide, and apparently the structure of the components of the spent sulfite liquor is modified and the oxidizing agents if later used are conserved for performing their special functions.

As heretofore indicated an important feature of our invention and discovery is that the oxidation of spent sulfite liquor components leads to increased activity or enhanced properties of said components respecting dispersing properties, and that these changed properties are manifested in the thinning of the viscosity of clay suspensions and also in the reduction of the gel-like properties of such suspensions. We have found that most oxidizing agents are operable in varying degrees as to the improvement produced. Particularly effective for this purpose are the following: hydrogen peroxide, ozone, lead dioxide, chromic acid, chlorine, alkali and alkaline earth hypochlorites, alkali metal chromate, alkali metal permanganate, alkali metal persulfate, alkali metal perborate, and electrolytic oxidation. These several agents are the preferred oxidizing agents.

The preferred forms of the oxidizing salts such as chromates, permanganates and persulfates are the sodium and potassium salts, but the ammonium salts may also be used and where available are included in the descriptive term "alkali metal salts."

When chromate is used for oxidation of spent sulfite liquor, the chromate is added preferably as sodium dichromate, since this form is the most readily available in commerce, and in subsequent discussions the chromate addition is referred to as dichromate. However, it is well known that in aqueous solution chromate ions ($CrO_4^{--}$) and dichromate ions ($Cr_2O_7^{--}$) are readily interconvertible, depending on the pH of the solution. In strongly acid solution, the dichromate ion predominates, but on neutralization with alkali the dichromate shifts to the chromate. Equilibrium is readily reached between the two forms, depending on the pH of the solution. Therefore the chromate may be added as either chromate or dichromate.

Further in regard to oxidation with chromium compounds: By experiment, we have discovered that oxidation of fermented spent sulfite liquor solids with sodium chromate at pH 8 provides a product which has substantially the same thinning effect on the drilling mud as a product obtained by oxidation with sodium dichromate at pH 4. In making this experiment both products were converted to the iron salt to make the mud test. Furthermore chromic acid may be used instead of the chromates in which case it is usually necessary to add sodium hydroxide to neutralize the product to about pH 4 to 5 prior to drying. All of these chemicals, i.e., sodium chromate, sodium dichromate and chromic acid give oxidized products, the iron, aluminum, copper and chromium salts of which are effective thinners for both lime and fresh water muds and give substantially similar results.

One method of obtaining oxidation is by electrolysis whereby oxidation takes place at the anode of an electrolytic cell. We have found that effective electrolysis can be obtained in a simple cell with or without a membrane to separate the anode and cathode, and improved products have been obtained with current usages from a desired effective amount up to about 5 ampere hours or more per gram of sulfonated lignin-containing material. It will be understood that the amount of impurities or contaminants, including carbohydrates and sulfur dioxide, in the sulfonated lignin-containing material electrolyzed, will change the electrical current consumption (i.e., amperes hours per gram of said sulfonated material) to obtain a given desired result. Thus we have found that from about 0.2 to 5.0 ampere hours per gram is suitable for fermented spent sulfite liquor but less current consumption will be necessary for more purified sulfonated material while greater current consumption may be necessary for less purified sulfonated lignin-containing material.

The electrolysis should be conducted under conditions which will bring about oxidation and not reduction. For this purpose a non-reactive anode, that is, an anode which does not dissolve substantially during the electrolysis, should be used. Thus platnium is suitable. Also, it is preferable to carry on the electrolytic oxidation prior to forming a lignosulfonate salt of the metal iron, aluminum, copper and chromium. However, if the salt is formed before electrolysis, any metal lost for example by plating on the cathode should be replaced, that is, the equivalent of such lost metal should be readded to the electrolyzed solution. This loss of metal ions may be substantially eliminated by electrolyzing under acid conditions of below about pH 3, or as stated above, by electrolyzing before forming the said salt.

Oxidation by addition of sodium perborate results in contamination of the product with sodium borate which must be removed to obtain the greatest efficiency of the product. One method of purifying the product is to remove the resulting borate ions as calcium borate which readily occurs if the starting material is a calcium salt of sulfonated lignin-containing material. The sodium perborate has an alkaline reaction and raises the alkalinity of the solution sufficiently to make calcium borate insoluble. The calcium borate may be removed by filtering or settling. Other methods known to those skilled in the art can be used for such purification. As set forth herein, chlorination also results in by-products of the reaction which should be removed by purification to obtain more effective products for drilling mud thinning.

In regard to the choice and use of oxidizing agents for practicing our invention, two factors are of prime importance: The strength or power of the oxidizing agent and the quantity of oxidant being used in proportion to the organic solids being oxidized. The strength or intensity of the oxidizing agent is expressed as an oxidation-reduction potential, and tables of these potentials are available in the chemical literature. We have found that the oxidizing agents which are suitable for carrying out our invention have a range of oxidation potentials greater than −1.3. The quantity of oxidant which is used to bring about the desired result may be expressed as the weight in grams of each oxidant which can be used per 100 grams of sulfonated lignin-containing material.

The amount of oxidant required depends on the specific oxidant being used, the nature and purity of the sulfonated lignin-containing material being treated and the conditions under which the treatments are conducted. In general and for practical operation, particularly respecting cost, 1% to 50% by weight of the several oxidants on the basis of the dry sulfonated lignin-containing material is all that is required to produce the desired result. However, when the oxidant is of a less concentrated character, as in the cases of alkali persulfate and perborates, both being costly, a large percentage of such oxidant is required to obtain the desired result. In any case, the reaction should be conducted in such a manner and with concentrations and proportions of the reactants so that gelation of the solution does not occur and a permanently soluble product is obtained. Solubility of our additive product is a fundamental requirement because the product is to be added to a drilling mud system, one component of which is water in which the additive product must dissolve to function as a thinner. Also, the dissolving brings about the distribution of the agent uniformly throughout the medium which increases the effectiveness of the product.

By way of explanation gels contain some occluded water soluble product and to the extent that the water soluble component is available or the gel dissolved in the medium said gels function somewhat as thinners. If any thinning action occurs with gelled (i.e. insoluble) products, such thinning is deemed not to be due to the gel functioning as a surface active agent but is due to the soluble component accompanying the gel. At higher pH., i.e., above about 9, the unwashed gelled products dissolve to some degree and show some tendency to thin the mud. Particularly is this true if the dissolved component is not washed out. In any case gels are not desirable because the material is less efficient.

Permanently stable solutions without gelation as shown in the examples may be obtained by conditions which slow the rate of reaction and keep the reactants in low concentration in relation to each other. Furthermore, other conditions affecting the formation of gels in more or less degree are the degree of sulfonation, the concentration of the sulfonated lignin-containing material, temperature, concentration of the oxidant, pH and effectiveness of mixing. In addition, the character of the sulfonated lignin-containing material being treated affects the amount of oxidant being used, in particular, the degree to which the materials have been previously purified, especially of reducing substance such as sulfur dioxide and carbohydrates, and/or fractionated. The degree of sulfonation is important in regard to water solubility. Also, we have discovered that the molecular weight, and apparently the molecular weight distribution within the fraction will affect the quantity of oxidant required to bring about the desired result. By way of example and not limitation, when a 45% to 50% solution concentration of fermented spent sulfite liquor solids is being used as much as 15% or more of hydrogen peroxide may be added, whereas, with potassium permanganate or potassium dichromate, such concentration of spent sulfite liquor thickens rapidly to a gel when about 10% of these agents is added. Furthermore, by way of example to show the effect that the prior history or character of the spent sulfite liquor has on the qantity of oxidant which may be used without causing gelation, when a caustic treated fermented spent sulfite liquor as described in Example XIV of Patent No. 2,935,473 is used at pH 4, about 8% of sodium dichromate will cause gelation at 42% total fermented spent sulfite liquor solids, 15% of sodium dichromate will cause gelling at 25% solids and 21% of sodium dichromate at 12% total solids, the dichromate in each case being added as a 25% solution in water at 60° C. Let it be noted that the above percentages are based on the weight of the dried fermented spent sulfite liquor solids being treated. Moreover under other conditions, even more of this oxidant can be added without causing permanent gelation or loss of water solubility. Purification and molecular weight are other factors which bring about gelation with different proportions of the oxidant. For example, using a solution of 45% to 50% total solids, about 4% by weight of the solids of the oxidant will gel the purified high molecular weight lignosulfonates at a pH of less than 4.5, whereas, as much as 8% or more of postassium permanganate or sodium dichromate may be added to the low molecular weight lignosulfonate fractions of the same concentration without gelation. But substantially larger concentrations of sodium or potassium dichromate may be added if the reactants are dilute. For example, a low molecular weight lignosulfonate fraction (40% of the total original fermented spent sulfite liquor solids) containing 17% of reducing substances expressed as glucose as a 2.5% solution in water treated at room temperature with 50% by weight of sodium dichromate as a 2.5% solution at a pH of 3 yielded after drying at room temperature a product which was slowly soluble in water. With 40% by weight of sodium dichromate the product was rapidly soluble in water. During such reactions the pH rises and acid such as sulfuric may be added to maintain the desired pH. The reaction under the above conditions was substantially complete in one hour. Thus the objective, namely a water soluble oxidized product, can be obtained with up to 50% by weight of the dichromate oxidant depending on the conditions used in the reaction. Similar results are obtained with potassium and sodium permanganate. The other oxidants which are less subject to providing insoluble products may also be used up to 50% and more by weight of the sulfonated lignin-containing material depending upon said conditions.

PILOT TESTS

We have discovered that the oxidants which are suitable for oxidizing the sulfonated lignin-containing material may be roughly divided into two groups: Those containing the metal ions chromium and maganese, i.e., the alkali metal chromates and the alkali metal permanganates and those involving gaseous oxidation components, such as hydrogen peroxide, sodium persulfate, sodium perborate and chlorine and, accordingly, different tests were originally necessary in establishing the maximum amount of the oxidant which could be used for any particular sulfonated lignin-containing material.

The maximum amount of oxidant particularly the chromates and permanganates which can be used with any one sulfonated lignin-containing material can be determined by the following pilot test. A dissolved sample of the sulfonated lignin-containing material is diluted to 2.5% solids, acidified to pH 3.0 with sulfuric acid for this particular test and various amounts of sodium dichromate added, together with sulfuric acid to maintain pH 3.0. The solutions are then allowed to stand about 1 hour at room temperature, adding sulfuric acid at intervals to maintain pH 3.0. At the end of 1 hour, the sample is heated to 80 to 90° C. and digested at this temperature for about an hour. The product samples are then dried at 60° C. and tested for solubility in water. The highest amount of dichromate giving a soluble product is the maximum limit of the amount of oxidant that can be used.

Another guiding test as to the maximum quantity of oxidant which may be used with any one sulfonated lignin-containing material in forming the products of our invention and discovery is an evaluation of the performance of the product as a thinning agent for drilling mud. To apply this test, a solution of about 10 grams of sulfonated lignin-containing material dissolved in 10 cc. of water is treated with 2 grams of ferric sulfate to convert the lignosulfonate to the iron salt, the solution heated to 80° C. and centrifuged to remove calcium sulfate. This solution is then treated with various amounts of the oxidant being tested at a pH of about 3 to 5 for this particular experiment and heated at 80°–90° C. for about 1 hour and then dried at 60° C. The product is tested for solubility in water, as above, and then for mud thinning properties as described herein. If the properties of the base mud are not improved by the addition of the product, then too high a concentration of that particular oxidant was used in the oxidation stage.

In using the oxidizing agents which involve a gas in the oxidation process, such as hydrogen peroxide, chlorine or sodium persulfate, a greater amount than that equivalent to sodium dichromate or sodium permanganate is required, since the use of such agents involves a more rapid deterioration and possible escapement of gas without complete reaction. It is probable also that the polyvalent metals manganese and chromium contribute to the effectiveness of the final product and these are not present in said other oxidants. Therefore, while the equivalent proportions are a guide to the relative amount of oxygen that can be used, they are not exactly equivalent in regard to the improvement which equivalent amounts of each of the oxidants will produce in the product.

Optimum thinning properties appear to be attained with sodium dichromate usages which give solutions well removed from the point of gelation. For a fermented spent sulfite liquor, of 40% to 45% total solids, the preferred amount of oxidant is about 7% to 9% of sodium dichromate based on the spent sulfite liquor solids for overall performance respecting the several properties required in drilling mud, but especially low water loss characteristics have been observed with about 18% of sodium dichromate. On the other hand, with chlorine which is considered an oxidizing agent herein, substantially more than the other agents can be added because some of the chlorine reacts by substitution with the spent sulfite liquor components, so that additional chlorine is required to bring about the desired oxidation results.

The time and temperature of the reaction is important in that the reaction should be allowed to go essentially to completion and the product should be substantially free of gels. It is preferable that the oxidation be controlled to yield a solution which can be dried to a powder which can be redissolved in water. If the oxidation is too severe the solution may gel or the dried solids may not be water soluble. Potassium permanganate and potassium dichromate are very rapid in their action and usually the oxidation is complete in 5 to 20 minutes and thereafter the solution is stable and shows no visible evidence of change on standing. If 10% of these agents are added as a 25% solution to concentrated liquor of greater than 40%, the spent sulfite liquor will gel in 15 minutes at room temperature, or if the solution is hot, the gelation will occur almost immediately. Solutions more dilute in organic solids, permit the addition of higher percentages of these oxidants. With milder oxidants, such as hydrogen peroxide, 15 minutes to 24 hours are necessary to bring about the completion of the oxidation. The temperature is usually a matter of choice and convenience but should be such that the reaction is complete in the time provided, although lower temperatures will give less difficulty with local formation of gels.

The concentration of the spent sulfite liquor can be any concentration up to 70% by weight of solids, but it is desirable to have the concentration of the liquor low enough to promote homogeneous reaction and prevent subsequent gelation. However, for practical reasons, it is preferred to use solutions of as high concentration as possible and, preferably, of the order of 40 to 50% solids concentration. For this reason, the dilute solution of the oxidant is added to the cool spent sulfite liquor solution of 40 to 50% solids with intensive mixing and after the reaction has been more or less completed, the solution is heated to the temperature at which drying will be conducted.

Thus, it is clear that, because of the choice of oxidants involved in providing required properties, the varied nature of the sulfonated lignin containing material, and the many factors involved in the physical conditions under which the reactions can be conducted, and also the many well known types of equipment used in mixing the reactants, that it is not feasible to set forth the exact operating conditions for each product of production. Furthermore, the factor of what mud property is most desired must be considered since the properties do not respond in a parallel manner to all treatments. That is, sometimes all the properties may be improved whereas in some cases only one of the properties may be improved. Accordingly, a selection must be made to obtain the desired result. But many examples are given in the herein disclosure which will enable persons skilled in the art to select conditions of treatment best suited to the particular requirement of the case in hand. But for most cases for use in the field the oxidants can be used in the concentration of 1 to 50% by weight of the organic solids as herein disclosed and thereby obtain a fully reacted and soluble product without gelation. The determination of the maximum amount of any given oxidant which can be used for any particular sulfonated lignin-containing material is determined by pilot tests as hereinbefore described. But the usage is one depending upon which mud property is most desired.

Special processing is necessary when chlorine is used as the oxidizing agent since in addition to oxidation and any other reactions which occur, there is a reaction of chlorine with the sulfite liquor components, and there are by-products from the reaction such as hydrochloric acid, which if left in the product may have a deleterious effect. For example, it has been found that on the addition of 1% to 4% of chlorine on the basis of the dry weight of the spent sulfite liquor solids, the properties of the sulfite liquor residue improve even without further purification to remove the end products formed, such as calcium chloride. The chlorination can be increased up to the addition of 45% of chlorine above which the chlorinated lignin tends to become insoluble in the strong hydrochloric acid and calcium chloride solution formed in which case it is necessary to further refine the products by removing the hydrochloric acid and reaction products. One of the best methods of accomplishing this purpose is to precipitate the chlorinated lignin with lime. This treatment has additional benefit of purifying the lignosulfonates not only of the hydrochloric acid and its end products, but also of the carbohydrates themselves. In this connection we have discovered that, whereas with regular spent sulfite liquor it is difficult to divide the lignosulfonates into several fractions by treatment with lime, surprisingly with the chlorinated lignins of our invention and discovery, the products can be divided very readily into fractions of different average molecular weight. This finding has been of extreme usefulness in the preparation of specific fractions of the chlorinated lignin as to molecular weight.

It has been known that lignosulfonates may be precipitated in mass from spent sulfite liquor by adding at one time relatively large quantities of lime slurry until a pH of 11–12 is reached. It is our discovery that the lignosulfonate can be precipitated and recovered as fractions of different molecular weights by adding the lime in small increments. Especially surprising and useful is our discovery that if the lignosulfonates are treated with chlorine then they may be more readily divided by lime precipitation into many small fractions, while at the same time purifying the lignosulfonates from the carbohydrates, chlorides, and other miscellaneous components of the sulfite liquor. The oxidized and chlorinated lignosulfonates, fractionated as to molecular weight by lime, may then be used as such as lime base mud thinners, or they may be converted to aluminum, iron, copper, and chromium salts and as such they also make highly effective fresh water drilling mud thinners. Such oxidized and chlorinated lignosulfonates may be converted to other salts such as sodium, magnesium, ammonium, etc., if calcium is objectionable in the product. Fractionation of the chlorinated spent sulfite liquor can also be accomplished by the alcohol fractionation process according to the disclosures of the copending application of Adolphson et al., Serial No. 703,664, filed December 18, 1957.

In summary, our invention comprehends the discovery that oxidation with or without forming a salt of a metal selected from the group of iron, aluminum, copper and chromium of the fractionated lignin-sulfonate-containing material provides an improved drilling fluid, and that the amount of oxidation can be greatly varied.

The oxidized products are useful as thinners, and this is particularly important because products can be prepared from the fractionated spent sulfite liquor merely by a simple oxidation process to give products equivalent as thinners to those prepared by more complex and expensive procedures.

In general, the products of our invention and discovery may be prepared from spent pulping liquor and the solids therein in the condition as received directly from the digester, or said products may be prepared from modifications of the said solid components of the spent pulping liquor. Such modifications may be provided by various treatments but, nevertheless, the resulting solids still do constitute soluble sulfonated lignin-containing materials. By way of example and not limitation the treated solids may be as follows: They may be as they exist after fermentation of spent sulfide liquor whereby the carbohydrate content is reduced or they may be as solids after hot spent sulfite liquor is acidified and air blown; or they may be obtained as set forth in U.S. application Ser. No. 391,116, filed November 9, 1953, now abandoned, which briefly states ". . . the spent sulfite liquor treated with an inorganic base, for example sodium hydroxide, in developing a final pH of 7–10, the same may be heated at 40° to 120° C. for a period of 30 minutes to 2 weeks, the solid organic components being maintained in solution throughout the said reaction period"; or the spent sulfite liquor may be essentially freed of carbohydrates and extraneous material by any one of a number of procedures, preferably by fermentation or by adding increments of lime, or by precipitation, dialysis, separation by organic solvents, and/or organic bases, or precipitated as basic ligno-sulfonate for example with lime, or by salting out with salts such as calcium or sodium chloride.

Furthermore, the spent sulfite liquor components may have been derived by the pulping with agents other than the usual magnesium, sodium, ammonium, and calcium bisulfites. These other agents disclosed herein are iron and aluminum bisulfites.

Oxidation treatment improves the spent sulfite liquor components in providing a more effective lime mud thinner or more effective thinning and dispersing action in general, i.e., in both lime base and fresh water muds.

Base exchange to form iron, aluminum, chromium, or copper salts enhances fresh water mud thinning properties, and improves some of the lime mud properties, as for example a base exchange with aluminum sulfate will yield a product with lower viscosity and gel characteristics in lime mud.

Up to this point the disclosure has dealt primarily and especially with the treatment of the spent sulfite liquor components and with their fractionation, their treatment with metallic salts, and the oxidation of said components, as well as with the use of such spent sulfite liquor components in preparing well drilling muds in general, in establishing or proving first, that a change is made in said components by the treatment of our invention and discovery, and, second, that the magnitude of the change is surprisingly great, as evidenced by the increased and augmented effectiveness of the treated components as revealed in the preparation of such drilling muds.

Now the disclosure will relate more specifically to the particular use of the said components in providing a product for controlling the colloidal and physical properties of gypsum base drilling muds so as to maintain them in the most desirable condition for use.

As one application of our invention we provide for muds where contamination is encountered from calcium sulfate (either as so-called "gyp," or in the anhydrite form, Portland cement), and similar calcium bearing material which would ". . . supply calcium ions which flocculate sodium bentonite as calcium bentonite through base exchange reaction. This flocculation of the bentonite results in an increase in the mud water loss. The water loss value of the drilling fluid may be 8 cc. at the time of entering a massive anhydrite section and 24 hours later be anywhere from 25 to 75 cc. if the mud is not treated properly. Anhydride and cement differ in that the former supplies the sulfate radical along with the calcium while the latter supplies the hydroxyl radical which increases the fluid pH. The sulfate radical does not affect the pH of the solution although the pH of the mud may drop slightly through replacement of the hydrogen ions from the bentonite particle by the calcium. The net effect of the drilling of sufficient anhydrite to saturate the mud aqueous phase with calcium is first to result in a marked increase of gel strength followed by a gradual increase in the water loss as the bentonite is converted to the calcium bentonite. As the calcium bentonite floccuates through loss of hydration properties, the gel strength decreases. The final result is a mud of high water loss, low viscosity and low gel strength." (P. 25, "Composition and Properties of Oil Well Drilling Muds," Rogers, Rev. Ed.)

In case of contamination with calcium bearing strata, Rogers further states (beginning on p. 379 of said text):

"The precipitation and removal of calcium from solution can be accomplished by at least four chemicals. These are:

(1) Bentonite.
(2) Soda ash ($Na_2CO_3$).
(3) Disodium phosphate ($Na_2HPO_4$).
(4) Barium carbonate ($BaCO_3$).

"The first, the use of bentonite, is not very efficient but has been used in drilling anhydrite together with large quantities of thinners. It is not recommended for large quantities of calcium sulfate and will not be discussed further.

"Soda ash is a common chemical precipitant for calcium sulfate. The reaction is:

$$CaSO_4 + Na_2CO_3 \rightarrow Na_2SO_4 + CaCO_3\downarrow$$

In this reaction the calcium is precipitated as calcium carbonate while soluble sodium sulfate is formed and remains in solution. In this reaction 1.0 pound of soda ash will precipitate 1.283 pounds of calcium sulfate. The reaction goes to completion and excess quantities of soda ash are not required. The method has two disadvantages. The first results from high pH of soda ash. The compound in strong solution has a pH of approximately 11.2. The action of high pH in gelling bentonite mixtures has been shown previously. Since the pH of the mud will increase greatly from excess soda ash it is usually customary to use SAPP as a thinner because of its low pH value. The second disadvantage results from the continuing accumulation of sodium sulfate as calcium carbonate is precipitated. Any increase in concentration of such soluble salts acts to increase the gel strength. One of the main difficulties with the soda ash treatment where thick beds of anhydrite are encountered is that the development of high gel strength from increased mud pH and sodium sulfate formation is so extensive that soda ash additions have to lag additions of thinner to reduce the mud pH and gel strength. As a result the calcium contamination continues to gain and the fluid loss continues to rise. It has been found impossible to maintain fluid-loss values below 15 cc. when using this treating method to drill massive anhydrite. Where the contamination consists of stringers of short duration, soda ash can be used to handle anhydrite satisfactorily as its extent is not sufficient to allow accumulation of sodium sulfate or the high pH condition.

"Disodium phosphate as a chemical precipitant for calcium sulfate is similar in many respects to soda ash. The reaction with anhydrite is:

$$3CaSO_4 + 2Na_2HPO_4 \rightarrow Ca_3(PO_4)_2 + 2Na_2SO_4 + H_2SO_4$$

The products of the reaction are calcium phosphate, which precipitates from solution, and sodium sulfate and sulfuric acid which remain behind as soluble constituents. In this reaction 1.0 pound of disodium phosphate will precipitate 1.430 pounds of calcium sulfate. While disodium phosphate is slightly more efficient, pound for pound, as a precipitant for calcium sulfate than is soda ash, its greater cost is a deterrent to its use for this purpose. The similarity with soda ash results from the single precipitation of the calcium with sodium sulfate as a residue. The divergence is largely in the pH difference of the two compounds. Disodium phosphate has a pH in strong aqueous solution of 8.6. The addition of this mildly alkaline compound to the mud does not result in as high gel strengths as obtained from soda ash. The residual quantities of sodium sulfate and acid act to increase the viscosity and gel strength of the mud. There are no data in the literature covering case histories of massive anhydrite drilled with this compound.

"Barium carbonate makes a satisfactory chemical precipitant when drilling massive anhydrite. The reaction is:

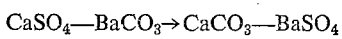

$$CaSO_4 - BaCO_3 \rightarrow CaCO_3 - BaSO_4$$

In some respects this treatment is superior to that of soda ash or disodium phosphate. This results from the complete precipitation of both the calcium and the sulfate radicals of the anhydrite as well as the barium and the carbonate of the treatment, leaving no soluble salts in solution. The barium carbonate is approximately neutral in pH and allows the mud to be restored to its original condition and allows lot fluid losses and viscosities to be maintained while drilling anhydrite. The principal disadvantage of the method lies in the large quantities of material required and the resulting high cost. 1.0 pound of barium carbonate will precipitate only 0.691 pound of calcium sulfate. In addition, the reaction is not very efficient as more barium carbonate must be used than called for by the reaction. Fortunately the addition of excess quantities of barium carbonate does not affect the mud adversely and overtreatment is primarily undesirable because of the cost of the barium carbonate so wasted."

Thus, all these methods of overcoming the contaminant calcium sulfate fail, or are objectionable for one reason or another.

By way of summary, it may be stated that presently three methods of treatment are commonly used in the field to overcome the deleterious effect of calcium sulfate:

(1) One method is to convert the mud to a limed mud by adding 3 to 5 pounds per barrel (a barrel being about 400 pounds) of hydrated lime, 1¼ pounds per barrel of tannin, or 2½ to 3½ pounds per barrel of calcium lignosulfonate and then adding carboxymethyl cellulose and starch to control water loss. This method is expensive.

(2) Another method used is the employment of high pH red mud. The mud is raised to about pH 12 with equal parts of caustic and tannin, and water loss is controlled by addition of carboxymethyl cellulose. This method is also objectionable because it is expensive.

(3) A third method, and probably the most commonly used, is to convert to a gypsum base mud by adding 3 to 4 pounds gypsum per barrel of mud. The mud is thinned to the desired viscosity with water, and 4 to 6 pounds per barrel of starch added to reduce water loss, and ¼ to ½ pound per barrel of a preservative added to prevent fermentation of the starch. This mud is objectionable because of the high flat gels which make the mud hard to pump in deep wells and make it difficult for cuttings to separate in the surface mud pits. Furthermore, by adding water, the volume of the mud is increased, and therefore part of the mud must be discarded to accommodate the capacity of the equipment. Also, because of the addition of water, the density of the mud is decreased and additional expensive weighting material must be added to increase the weight of the mud for deep drilling.

One of the outstanding features of using the product of our invention and discovery in preparing drilling muds is to provide a method of controlling mud properties against contaminants in drilling calcium sulfate bearing strata which is less expensive and requires a minimum of effort and attention at the time such a stratum is encountered in the drilling, or when contamination by such contaminants is anticipated. In fact, it may be only necessary to add 3 to 4 pounds per barrel of additional conditioner to the mud being used in the well at the time the anhydrite is approached. N.b. Our product is particularly relatively inexpensive.

A further outstanding feature of the use of the product of our invention is the providing of a gypsum base mud with a low gel rate—that is, a mud with a low initial gel strength so that cuttings will settle out and be removed while the mud is flowing to and circulating in the mud pit, but with a sufficiently high gel strength in the quiescent state so that sand and cuttings will not settle out in the well if drilling operations are temporarily interrupted for a period of time. Heretofore, gypsum base muds in common use have had high flat gels, that is, high initial and final gels. The viscosity of these muds increased as sand and fine cuttings accumulated, and it was necessary to maintain low viscosity by discarding some of the mud and bringing the remainder up to volume with water and bentonite. This treatment raised the water loss and it was necessary to add starch and carboxymethyl cellulose, which are expensive, to maintain a low water loss. By using a mud as in this invention, with a low initial gel strength without watering-back, that is, the addition of more water, the cuttings nevertheless to settle out in the mud pit, and also the maintenance cost of replacing discarded mud is eliminated.

In other words or by way of summary, the gypsum base muds utilizing the sulfonated lignin containing additives of our invention and discovery constitute a new drilling mud system of our invention and discovery. Heretofore, calcium sulfate contamination was eliminated by chemical means or the contaminated mud was discarded and new mud substituted. In combination with the additives of our invention calcium sulfate saturated muds, i.e., gypsum base muds, have very desirable drilling mud properties and also the high calcium ion content of these muds is effective in reducing the hydration of certain shales encountered in oil well drilling. This prevents the shales from swelling and closing the bore hole and the shale cuttings from making an excessive amount of thick mud.

Another desirable feature of our gypsum base muds is their thermal stability, a property essential for drilling deep wells in which high temperatures are encountered. These muds of our invention are characterized by their thermal stability at deep well temperatures.

A further important feature of the use of our products or additives is found in providing a mud resistant to gypsum contamination, which may be converted to an oil emulsion mud.

Still another outstanding characteristic of the use of the products or additives of our invention and discovery is found in the providing generally of muds with good thermal stability for drilling deep wells where high temperatures are encountered. Temperatures can very seriously affect the necessary properties of the drilling mud, and therefore it is a very important property of the product and process of this application to provide thermal stability.

The treatment of the drilling mud according to our invention and discovery to control calcium sulfate contamination comprises adding a lignosulfonate thinner or additive which may be derived for example from spent sulfite liquor as hereinabove described, combined with sodium sulfate, said combination being formed in proportions of 1% to 100% by weight of the sodium sulfate based on the said spent sulfite liquor solids, the most advantageous proportion being determined by a pilot test to determine about the proportion necessary to meet the particular situation developed by the drilling. In place of sodium sulfate, other salts such as iron sulfate, aluminum sulfate, sodium sulfite, potassium sodium tartrate, sodium oxalate, sodium phosphate, sodium carbonate, sodium bicarbonate, and their corresponding potassium compounds, i.e., potassium sulfate, potassium sulfite, potassium oxalate, potassium phosphate, potassium carbonate, potassium bicarbonate and mixtures thereof, may be used. All of these compounds react with dissolved calcium sulfate to precipitate calcium salts less soluble than calcium sulfate and produce soluble sulfates. The latter through common ion effect further reduces the solubility of calcium sulfate and hence decreases the calcium ion concentration. In many muds it is desirable to maintain low calcium ion concentration to avoid clay flocculation. Regarding the use of bentonite clays, Rogers states, on page 378 of his text quoted above:

"Sodium bentonite is a highly hydrated, dispersed and ionized member of the bentonite salts and possesses good fluid-loss reducing properties. Calcium bentonite, on the other hand, is poorly hydrated and dispersed and tends to flocculate. This flocculation results in fewer but larger particles which tend to precipitate. As the calcium bentonite forms in increasingly greater percentage the agglomeration of the particles and precipitation result in a decreased viscosity and gel strengths and increased fluid loss properties. The formation of calcium bentonite results in depletion of calcium in the aqueous phase unless replaced by further solution of the contaminant."

Parenthetically, be it particularly noted, that the conditions of the various strata encountered in the drilling of oil and gas wells are so complex and vary so much and vary from area to area that a pilot test should be made to determine what amount of the product or additive of our invention and discovery is effective and what amount is most efficient as is commonly done in the drilling operations for conditioning the particular mud for the particular well being drilled. Such testing commonly continues as the drilling proceeds.

In regard to making the salt of the sulfonated lignin by base exchange, any or all of the sulfonated lignin may be converted and the efficiency of the resultant product will depend on the degree of conversion. As hereinbefore stated, the calcium, magnesium, ammonium or sodium base lignosulfonates are effective in lime base muds but not effective in thinning fresh water muds. On the other hand, the lignosulfonate salts of iron, aluminum, copper and chromium do thin the fresh water muds. Hence, it is necessary to convert the former salts to the latter and the proportion of conversion determines the efficiency.

Thus, an effective amount of conversion would be an amount of conversion to the latter salts which would in a pilot test in a mud show a noticeable thinning of the mud. By way of example but not limitation, if the salt were fully converted then even the addition of a quarter of a pound per barrel of the converted salt would show thinning whereas if say only 10% of the sulfonated salt were converted then it would require adding a quantity of the product on the order of several pounds per barrel to show thinning.

The amount or concentration of the additives of our invention and discovery which can be added to drilling fluids by way of conditioning these fluids to the desired properties will depend on such factors as the nature of the mud to be treated and the contaminants therein or to be encountered, the characteristics desired in the mud, and the degree of purity of the additive and the specific agents used in preparing and formulating the additive according to our disclosure. For practical purposes, usages of the order of one-quarter of a pound to thirty pounds per barrel are preferred. It is one of the advantages of our additives that they do not show the thickening of a mud at low usage that is experienced in the use of quebracho for thinning drilling mud, which thickening is referred to as "over treatment." In fact, in the use of quebracho special attention is required to eliminate the danger of "over treatment," which often occurs around 4 to 6 pounds of quebracho per barrel of mud. With the additive of our invention, prepared from a fermented spent sulfite liquor oxidized with sodium dichromate and converted to the iron salt, for example, the danger of over treatment is avoided since thickening does not occur below 15 to 20 pounds per barrel. Furthermore, decreases in water loss are observed with usages up to 50 to 100 pounds or more per barrel, particularly in gypsum and salt water drilling fluid with only slight thickening. Such amounts of additive are used in taking full advantage of our invention and discovery. The above emphasizes the universality character of our invention and discovery in the area of permissible amounts to be employed without adverse action. Thus it is a particular advantage of the additive of our invention that water loss values as low as 1 or 2 cc. may be obtained with high usage of the additive without as much thickening in many cases as would occur if water loss were reduced by addition of carboxymethyl cellulose or like water loss reducers which have a substantial thickening effect on drilling mud. Furthermore, when starch is used for water loss control, it has the definite disadvantage of deterioration by microbiological action to which our additives are very resistant. All of which is of practical importance to the well drilling crew. Oxidized lignosulfonates without conversion to salts of iron, aluminum, copper and chromium as well as the unoxidized lignosulfonate salts of these metals can be added in the same concentration range to drilling mud for effective thinning and water loss control.

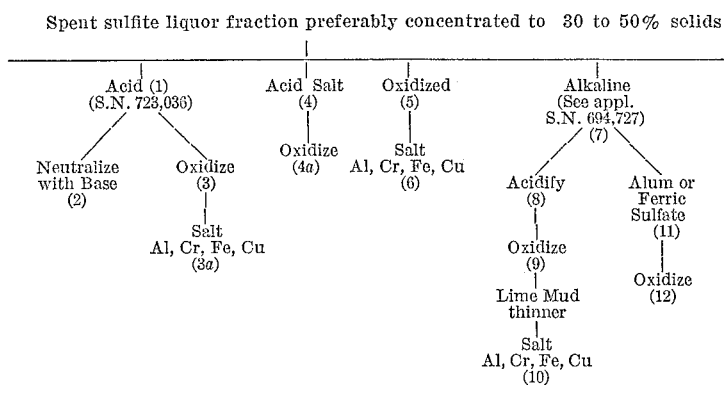

Manifestly, if the starting material is a fraction of spent sulfite liquor (a salt of lignosulfonic acid), then any of the products of our invention may be prepared as set forth in the above outline of the possible manifold treatments within our invention. Thus, to follow through in detail, the starting material may be, as previously discussed, a fraction of spent sulfite liquor, either a purified lignosulfonate salt or a fraction of spent sulfite liquor, roughly fractionated to separate lignosulfonates with particular properties and molecular weights. The solids to be treated are preferably concentrated to 30% to 50% solution.

One method of operation, following from point (1) on the chart, is to treat the concentrated liquor with an acid and heat for example for 1 to 2 hours at 95° C. to 100° C. At this point if calcium sulfate is precipitated, it may be separated, depending on the purity desired in the final product. Said acid treatment may be carried out at less than about pH 4 at temperatures from 50° C. to 210° C. for times causing thickening of the solution short of gelation.

This product can be neutralized with a base such as sodium hydroxide (we mean a compound which yields hydroxyl ions in solution) to a pH above 3.5 so that it can be dried with degradation and then used as such as a limed mud thinner (2) without further treatment; or the product of (1) can be further improved by oxidation, preferably with an alkaline reagent such as potassium permanganate or sodium dichromate as indicated at point (3) in the outline. Either product may be used as a liquid, or it can be reduced to solids by evaporation and drying. In either case, these products may be used as thinners for drilling muds. Alternatively, the product can be converted to the salt (3a) of iron, chromium, copper and aluminum, and this is outstanding in the fact that the thinning action is improved for both fresh water and lime base muds.

Again, the acid treatment may be carried out with an acid salt such as ferric sulfate, aluminum sulfate, chromium sulfate, or copper sulfate in such proportions as to also effect a base exchange (4) and yield a product which is effective for thinning all types of water base drilling mud. This product may also be oxidized (4a) to obtain further improvement in mud thinning properties.

Rather than treating with an acid as in (1), the concentrated liquor may be treated directly with an oxidizing agent as in (5). In this case some of the oxidizing agent is required to oxidize the sulfur dioxide which escapes in the case of acid treatment. This oxidized product may be used as a mud thinner, particularly as a lime base mud thinner, or it may be converted to the iron, aluminum, copper, or chromium salt as in (6) whereby the properties are unexpectedly enhanced for thinning both lime base and fresh water muds.

Another pretreatment, which gives improvements in the sulfonated lignin-containing material preparatory to following the procedures of our invention, is the heating of the solution of the sulfonated lignin-containing material in water solution at highly elevated temperature and at a pH greater than 4 and preferably about 7 to 10. The heating is carried out for a short period of time above a temperature of 170° C. and of the order of 30 minutes at a temperature of 200° C. At 220° C. the lignosulfonate becomes partially insoluble in water and gel-like and is not suitable for further use for the purpose of making drilling mud thinners. This heating is conducted while blowing the solution with a gaseous medium such as air or nitrogen. Products prepared in this manner have improved properties, said improvement in properties being somewhat equivalent to those attained by our process of acid treatment as described in our U.S. Serial No. 723,036.

Another and highly effective procedure is to follow the process outlined in our application Serial No. 694,737 involving treatment with alkali. This product (7) may or may not be acidified (8) and oxidized (9), whereby a drilling mud thinner particularly effective for lime base muds is obtained, or further processed to form the aluminum, iron, copper and chromium salt (10). Instead of acid, aluminum, iron, copper, and chromium sulfate may be used through which an economical and effective spent sulfite liquor additive (11) is produced, the properties of which may be greatly enhanced by oxidation with any of the oxidizing agents previously mentioned, to yield (12) an extremely effective agent for conditioning all types of water base drilling fluids, such as, fresh water, lime base, gypsum and oil emulsion types.

Accordingly, we have discovered that fractionated spent sulfite liquor components and materials identified in general as lignosulfonates, are greatly improved in their effectiveness as dispersing agents and for use in drilling muds by treating them with one or both of the following steps:

(1) Oxidizing said spent sulfite liquor components.
(2) Treating to form a salt having an element selected from the group consisting of iron, aluminum, chromium, and copper.

The order of the above steps or treatment (oxidizing or forming a salt) is immaterial.

Continuing our treatment against contamination by calcium sulfates, the product resulting from both steps 1 and 2, or the product of step 2, is treated with a salt in the proportion of 1% to 100% of the lignosulfonate solids of said spent sulfite liquor solids, selected from the group consisting of sodium sulfate, sodium sulfite, potassium sodium tartrate, sodium oxalate, sodium phosphate, sodium carbonate, sodium bicarbonate, aluminum sulfate, iron sulfate, and their corresponding potassium compounds and mixtures thereof.

*Method of testing.*—Specific examples of treatment, together with tables showing results of tests of the materials, will now be set forth. The method of making the tests is that commonly followed in the drilling industry.

The sulfonated lignin additives of our invention may be used in many ways, but chief among these is that revealed in drilling muds. For this purpose a material is required which will bring about a lowering in viscosity of the complex clay suspension which is termed the drilling mud, and will also serve to decrease its gel strength and water loss characteristics. The accepted methods for evaluating materials to ascertain their utility for drilling muds are described in the publication entitled "American Petroleum Institute Code 29," third edition, May 1950—"Recommended Practice on Standard Field Procedure for Testing Drilling Fluids." This manual is prepared and published by the American Petroleum Institute, Division of Production, Dallas, Texas, and is used throughout the industry for testing drilling muds.

In making the laboratory tests on drilling muds according to the procedures mentioned above, it is necessary to use a clay or combination of clays. In general, clays are of extremely wide distribution in the earth's surface and are complex and difficult to define chemically. For example, H. A. Ambrose, PhD. and A. G. Loomis, PhD., state regarding drilling mud clays: ". . . analysis tells us little with respect to the properties required in drilling. There has been no correlation between chemical analysis and clays and their suitability for drilling purposes, . . . ." The Science of Petroleum, volume I, page 458, 1938, Oxford University Press (London). Although clays have been divided into several classes according to their chemical and physical form, the materials encountered or used in drilling muds are mixtures of said clays and so it has become practically accepted to define these materials in terms of what is termed "yield value." According to practice then ("Principles of Drilling Mud Control," 8th edition, pages 2 and 3, published by the American Association of Oil Well Drilling Contractors, Dallas, 1951), clays are defined in terms of yield value, which is the number of barrels of 15 cp. mud that can be prepared from a ton of material along with water. Thus in the examples, we refer to the use of natural clay and define the "yield value" to characterize the type of clay which would give similar results.

By following the standard methods identified above and using clays of defined yield value, the efficacy of the sulfonated lignin additives of our invention is measured in terms of initial gel strength, viscosity, ten-minute gel strength, and water loss.

The Stormer viscometer has been used almost universally in making viscosity measurements according to the standard methods of the American Petroleum Institute. Also let it be noted that another means of measuring viscosity is a motor driven rotational viscometer known as the Fann V-G meter (viscosity-gel). This instrument measures two factors of viscosity called "yield value" of fluids and "plastic viscosity" which are so related that two times the plastic viscosity plus the yield value is proportional to the viscosity at 600 r.p.m. Since the plastic viscosity is essentially constant for any one mud, the variations of the yield values indicate directly the variation of viscosity and therefore the yield value is reported in the tables where the measurements were made with the Fann instrument.

Generally only the yield value of the drilling mud is affected by the addition of thinners. Yield values are reduced by drilling mud thinners but plastic viscosity is affected very little. The plastic viscosity can only be changed by adding to or removing water from the mud. The Fann V-G meter type of instrument is preferred for drilling muds since it indicates whether thinners are needed to lower yield or whether water is needed to decrease plastic viscosity.

The viscosity factor "yield value" of fluids defined above should not be confused with "yield value" of a clay which has been defined hereinabove as the number of barrels of 15 cp. mud that can be prepared from a ton of clay along with water.

*Mud test procedures.*—The following mud test procedures describe in detail the mud preparation and testing procedures used. The clays defined in the test procedures given below were used in all of the first twelve examples except Examples II and III in which another but similar clay was used having a yield value of 36, that is, the clay would yield 36 barrels of 15 cp. mud per ton of clay. Clays in other examples are defined therein but have about the same yield value.

*Lime mud test procedure.*—Sixty grams of a commercial rotary drilling clay with a yield value of 45 barrels of 15 centipoise mud per ton of clay were mixed with 325 milliliters of distilled water in a Hamilton Beach No. 30 "Drinkmaster" mixer for 15 minutes at 15,000 r.p.m., and then aged by rolling, i.e., agitating in pint bottles overnight at room temperature. The aged mud was "broken over" to a limed mud by adding 6 grams of calcium hydroxide, 6 milliliters of sodium hydroxide solution containing 0.25 gram sodium hydroxide per milliliter, and the sulfonated lignin containing material additive to be tested (each gram added equivalent to 1 pound per barrel) and mixing for 5 minutes at high speed. "Broken over" is a term used in the industry to denote the procedure and the accompanying change in properties which occur when an excess of calcium hydroxide and sodium hydroxide is added to a clay with intimate mixing as next above set forth. The mud was then returned to the bottle and again rolled overnight at room temperature, and finally mixed another 5 minutes immediately before determining viscosity, gels and water loss by the standard procedure of the American Petroleum Institute.

*Fresh water mud test procedure.*—Thirty grams of a commercial sodium bentonite rotary drilling clay with a yield value of 92 barrels of 15 centipoise mud per ton of clay were mixed with 335 milliliters of distilled water in a Hamilton Beach No. 30 "Drinkmaster" mixer at 15,000 r.p.m. for 15 minutes and then aged by rolling overnight in pint bottles at room temperature. The thinner additive (each gram added equivalent to 1 pound per barrel) and sodium hydroxide to give the desired pH were then added, the mud mixed 5 minutes, and again rolled overnight at room temperature. A final 5 minute mix was made immediately before measuring viscosity, gels, and water loss by the standard methods of the American Petroleum Institute. The mud may be returned to the bottle and rolled a further 24 hours at 150° F. and then retested to obtain information on the effect of temperature. Higher temperature aging is described in Example XVII.

*Gyp mud test procedure.*—The gyp (or gypsum base) mud test procedure is the same as the fresh water mud test procedure except that 6 grams (each gram added equivalent to 1 pound per barrel) of plaster of Paris ($CaSO_4 \cdot \frac{1}{2}H_2O$) were added together with the thinner additive, and the mud was subsequently mixed for 20 minutes instead of 5 minutes.

*Oil emulsion test procedure.*—The base mud is prepared as described above and may be any of the types such as lime base, gypsum, fresh water and salt water muds. After adding the thinner additive being tested and making the standard tests for gels, viscosity and water loss, 10 to 20% by weight of diesel oil is mixed into the mud with a high speed mixer at 15,000 r.p.m. and the resulting oil in water emulsion mud tested for gels, viscosity and water loss by the standard API procedures. Note that the term "thinner" is used in the art in reference to agents or additives for reducing the viscosity of drilling mud.

*Example I*

This example illustrates the procedure for fractionating spent sulfite liquor by lime precipitation to obtain calcium lignosulfonate fractions with better drilling mud thinner properties than the original spent sulfite liquor.

One thousand grams of spent sulfite liquor solids in 10% water solution were heated to about 85° C. and lime slurry was added (130 grams of calcium oxide), whereupon an appreciable amount of organic precipitate was obtained. (Temperature not critical, 85° C. equals temperature of liquor as received from blow pit.) This small precipitate settled rapidly and was separated by decanting and recovered as a cake by centrifuging the thick slurry. Further fractions were recovered successfully in the same manner by adding 25 gram increments of lime and removing the precipitates formed. The precipitates were washed by decantation with saturated lime water to prevent resolution by water during washing, then redissolved by adding sulfuric acid to pH 5 to 6 and dried after removing by filtration calcium sulfate. Results of the fractionation are shown in Table 1.

TABLE 1 OF EXAMPLE I.—FRACTIONATING OF SPENT SULFITE LIQUOR BY LIME PRECIPITATION

| Fraction No. | Cumulative Lime Added, Percent of Spent Sulfite Liquor Solids Originally Present in Solution | pH | Yield of Calcium Lignosulfonate, Percent of Spent Sulfite Liquor Solids | Diffusion Coefficient mm.²/day |
|---|---|---|---|---|
| 1 | 13.0 | 10.2 | 14.4 | 5.8 |
| 2 | 15.5 | 10.8 | 4.5 | 6.5 |
| 3 | 18.0 | 11.3 | 10.0 | 7.3 |
| 4 | 20.5 | 11.8 | 4.6 | 8.7 |
| 5 | 23.0 | 12.1 | 4.6 | 9.7 |
| 6 | 25.5 | 12.2 | 4.7 | 10.4 |
|   |      |      | 42.8 |     |

In redissolving, other acids than sulfuric may be used in lowering the pH of the separated precipitate and bringing about solution. It may be preferred to use an acid such as carbonic, sulfurous, or oxalic, which are characterized by giving insoluble compounds with calcium whereby excess calcium is removed from the product. In some types of drilling mud, it is desirable to have the additive as free as possible of soluble salts, so that acids such as hydrochloric and acetic which form soluble calcium salts would not be desirable, although for some purposes they could be used. Also the precipitate can be dissolved by adding a salt which gives by base exchange an insoluble calcium salt, i.e., sodium, iron, chromium, copper, aluminum, magnesium ammonium, etc. sulfates, phosphates, oxalates, sulfites, etc. Thus the desired iron, copper, aluminum, and chromium salts can be made directly.

It will be understood that any fraction will dissolve if the pH is lowered below the pH at which it was precipitated, but the addition of sulfuric acid to provide pH 5 or 6 is helpful in giving quick solutions and approximately neutral products. Thus, we have discovered that it is possible to divide the lignosulfonates of spent sulfite liquor into several fractions by adding as the first step a relatively small or minute amount or an increment of lime, that is, 130 grams in 10,000 grams of spent sulfite liquor of 10% concentration which caused to precipitate an appreciable, i.e., recoverable, amount of organic precipitate, namely 14.4%, and also we discovered, contrary to expectations, that said amount settled out surprisingly rapidly. This precipitate was separated out as fraction No. 1. Then, as a second step a small amount or increment of lime, i.e., 25 grams (CaO) was added to the remaining solution, whereupon a second small amount, 4.5% of the original spent sulfite liquor solids, was precipitated and this likewise rapidly. This was separated. Successively the above steps were repeated until six fractions were removed.

Differences in drilling mud thinner properties of the fractions, the molecular weights of which are illustrated and identified in Table 2 of Example I.

may be varied by adding smaller amounts of lime to give smaller fractions characterized by having more uniform molecular weight distribution, or a fraction may be made including parts of fractions 2 and 4 in fraction 3.

Also, this example illustrates that our invention and discovery teaches that by proper manipulation the organic precipitate can be obtained between pH 10.0 and 12.0 from spent sulfite liquor upon adding lime, and can be recovered as a number of calcium lignosulfonate fractions of different molecular weights. We also have discovered that these different fractions exhibit different improved properties, thereby making it possible to select the improved fraction in supplying a product exhibiting the exact or more nearly exact properties required for a particular application.

*Example II*

To illustrate the improvement in drilling mud thinner properties obtained by chlorinating spent sulfite liquor according to our invention and discovery, samples of fermented spent sulfite liquor were concentrated to 30% solids by evaporation and then commercial chlorine gas was bubbled into the liquor until weight increases corresponding to 1, 2, 3 and 4% of the solids of the fermented spent sulfite liquor solids were obtained. Samples chlorinated with 1% and 2% chlorine had pH 3.2 and 2.6 respectively and were dried at 60° C. The 3% and 4% chlorinated samples had pH 1.4 and 1.0 respectively and were neutralized to pH 2.0 with sodium hydroxide before drying at 60° C. to avoid deterioration of the components of the spent sulfite liquor. The dried samples were tested as limed mud thinners and the results are set forth in Table 1 of Example II.

TABLE 1 OF EXAMPLE II.—CHLORINATION OF A FERMENTED SPENT SULFITE LIQUOR

[Limed Mud Tests Using 6 pounds per barrel]

| Percent Cl$_2$ in Spent Sulfite Liquor | Limed Mud | | | | 10% Diesel Emulsion | | | |
|---|---|---|---|---|---|---|---|---|
| | I.G. | Visc. | 10G. | W.L. | I.G. | Visc. | 10G. | W.L. |
| 0 | 0 | 13.0 | 60 | 18.2 | 12 | 29.0 | 180 | 10.5 |
| 1 | 0 | 13.0 | 30 | 17.8 | 0 | 33.0 | 70 | 10.0 |
| 2 | 0 | 11.0 | 20 | 17.7 | 0 | 30.2 | 60 | 10.0 |
| 3 | 0 | 9.8 | 5 | 16.5 | 0 | 27.7 | 40 | 9.7 |
| 4 | 0 | 9.8 | 3 | 17.2 | 0 | 26.5 | 35 | 9.5 |

[Limed Mud Tests Using 4 pounds per barrel]

| | | | | | | | | |
|---|---|---|---|---|---|---|---|---|
| 0 | 65 | 25.0 | 195 | 19.1 | Thick | | 280 | 10.7 |
| 1 | 25 | 20.0 | 110 | 17.8 | 160 | 58.0 | 280 | 10.7 |
| 2 | 20 | 18.7 | 100 | 16.8 | 160 | 61.2 | 290 | 10.7 |
| 3 | 10 | 18.7 | 90 | 16.8 | 120 | 61.5 | 250 | 10.4 |
| 4 | 7 | 20.0 | 85 | 16.8 | 110 | 64.0 | 260 | 10.4 |

TABLE 2 OF EXAMPLE I.—LIMED MUD TESTS ON FRACTIONS OF SPENT SULFITE LIQUOR PREPARED BY LIME PRECIPITATION

| Fraction No. | Lb./bbl. | Initial Gel, gms. | Visc. | 10 Gel, gms. | Water Loss, cc. |
|---|---|---|---|---|---|
| Original Spent Sulfite Liquor | 4 | 100 | 29.0 | 250 | 21.9 |
| 1 | 4 | 20 | 43.2 | 30 | 16.7 |
| 2 | 4 | 0 | 15.0 | 60 | 14.0 |
| 3 | 4 | 0 | 9.8 | 40 | 14.2 |
| 4 | 4 | 0 | 11.0 | 60 | 15.0 |
| 5 | 4 | 0 | 12.3 | 100 | 15.3 |
| 6 | 4 | 10 | 14.0 | 160 | 16.2 |

Table 1 of Example I shows that the calcium lignosulfonates were fractionated into fractions of different molecular weight as shown by the diffusion coefficient data. Table 2 of Example I shows that fraction 3 was the most effective drilling mud thinner because of the greatest reduction in the properties noted which particularly means that less water is required to give a pumpable mud drilling fluid with a minimum of water loss all of which properties are of most fundamental importance in oil and gas well drilling. Of course, the fractionation In all cases of chlorinating, the pH should be adjusted by the addition of an alkali before drying to a value of more than 2.0 and less than 10.0.

Table 1 of Example II shows a progressive improvement in mud thinner properties as the percentage of chlorine is increased up to 4% chlorine. When less of the additive is added to the mud, some of the mud thinner properties of the sample chlorinated with 4% chlorine are poorer than obtained with the sample chlorinated with 3% chlorine. Thus, it becomes necessary to purify chlorinated spent sulfite liquor (i.e., for example, remove calcium chloride) when more chlorine is used than 4%, otherwise better products are not obtained.

*Example III*

To illustrate the fractionation of a chlorinated spent sulfite liquor by lime precipitation a sample of spent sulfite liquor was chlorinated by bubbling in chlorine until the weight increased by an amount equal to 43% of the weight of spent sulfite liquor solids and then was recovered by lime precipitation in the same manner as described in Example I. Fractionation data are shown in the following table.

TABLE 1 OF EXAMPLE III.—FRACTIONAL LIME PRECIPITATION OF CHLORINATED LIGNOSULFONATES FROM CHLORINATED SPENT SULFITE LIQUOR

[43% chlorine on the basis of the spent sulfite liquor solids]

| Fraction No. | pH | Yield, percent of Spent Sulfite Liquor Solids | Cumulative Yield Percent of Spent Sulfite Liquor Solids | Diffusion Coefficient mm.²/day |
|---|---|---|---|---|
| 1 | 5.2 | 16.7 | 16.7 | 8.2 |
| 2 | 9.6 | 41.0 | 57.7 | 9.2 |
| 3 | 11.1 | 18.7 | 76.4 | 13.8 |
| 4 | 12.0 | 6.7 | 83.1 | 15.6 |

By comparison with Table 1 in Example I it is seen that the chlorinated lignosulfonates begin precipitating at a much lower pH than the calcium lignosulfonates of the original spent sulfite liquor. The resulting wide pH range of precipitation makes possible a closer control of fractionation reproducibility than is obtainable with lime precipitation of spent sulfite liquor solids.

Comparative drilling mud tests were made on the fractions of Table 1 of Example III as shown in the following table:

muds, the fraction 3 gave the greatest lowering in viscosity although fraction 2 itself was highly effective as compared with either fraction 1 or 4 or especially the original sulfite liquor.

The outstanding teaching of Table 2 of Example III is that it shows that different fractions of the spent sulfite liquor have varying properties and therefore that it is of the utmost importance, in using spent sulfite liquor where definite properties are desired, to fractionate said liquor and determine which fractions will give the best properties for the particular problem in hand. The chlorination treatment is thus seen to play a very important part in providing fractions of the spent sulfite liquor. It greatly facilitates the procuring of such fractions, and furthermore, the very important feature is revealed that the fractions of the chlorinated product are of greatly improved character. In other words, the effectiveness of the lignosulfonate components is greatly increased by chlorination.

*Example IV*

To illustrate the yields of chlorinated lignosulfonates obtained by lime precipitation purification of chlorinated spent sulfite liquor by the addition of varying amounts TABLE 2 OF EXAMPLE III.—COMPARATIVE LIMED MUD THINNING PROPERTIES OF CHLORINATED LIGNOSULFONATE FRACTIONS OBTAINED BY LIME PRECIPITATION

| Sample | Lb. bbl. | Limed Mud | | | | 10% Diesel Emulsion | | | |
|---|---|---|---|---|---|---|---|---|---|
| | | I.G. | Visc. | 10G. | W.L. | I.G. | Visc. | 10G. | W.L. |
| Original Fermented Spent Sulfite Liquor (before chlorination) | 4 | 65 | 25.0 | 195 | 19.1 | Thick | | | |
| | 6 | 0 | 13.0 | 60 | 18.2 | 12 | 29.0 | 180 | 10.5 |
| Fraction 1 | 4 | 0 | 15.5 | 20 | 15.0 | 10 | 46.0 | 240 | 9.3 |
| | 6 | 0 | 12.3 | 0 | 11.3 | 0 | 26.5 | 10 | 7.2 |
| Fraction 2 | 4 | 0 | 9.8 | 0 | 15.5 | 0 | 27.5 | 70 | 9.4 |
| | 6 | 0 | 8.7 | 0 | 10.7 | 0 | 20.0 | 15 | 7.2 |
| Fraction 3 | 4 | 0 | 11.0 | 10 | 16.9 | 0 | 25.0 | 80 | 9.8 |
| | 6 | 0 | 9.0 | 0 | 16.0 | 0 | 17.0 | 5 | 9.8 |
| Fraction 4 | 4 | 5 | 13.5 | 40 | 18.8 | 50 | 39.5 | 200 | 11.5 |
| | 6 | 0 | 8.5 | 10 | 20.8 | 0 | 20.0 | 80 | 11.6 |

The spent sulfite liquor chlorinated with 43% of chlorine before fractionation and without purification to remove calcium chloride on addition to lime base mud gave a thicker mud than did untreated fermented spent sulfite liquor.

The data of Table 2 of Example III shows that the chlorination of the spent sulfite liquid by passing of chlorine gas through spent sulfite liquor renders the spent sulfite liquor components especially effective in conditioning lime base muds. Particularly are they effective in increasing the thinning property, as will be seen by noting the results respecting viscosity for fractions 1–4. All of said fractions are improved over the original spent sulfite liquor viscosity figure of 25.0. Fraction 2 shows a viscosity of 9.8 which is the preferred result. Thereafter, fractions 3 and 4 show an increase in viscosity which indicates that the fraction 2 gives the optimum result in lowering viscosity. Referring to the other properties of fraction 2 in comparing these with the other properties of the fractions 1, 3, and 4, it is to be noted that the properties of fraction 2 are optimum. In other words, it is not only to viscosity that fraction 2 gives optimum results, but in general to other properties. In addition, it is noted that these fractions are highly effective in producing oil emulsion type muds and whereas the optimum properties occurred with fraction 2 for the regular lime base drilling mud in making oil emulsion type lime base of chlorine to 45% fermented spent sulfite liquor, the following table is presented.

TABLE 1 OF EXAMPLE IV.—SPENT SULFITE LIQUOR CHLORINATION AND RECOVERY OF PURIFIED LIGNOSULFONATES, LIME PRECIPITATION YIELD

| Chlorine Used in Chlorination, Percent of Spent Sulfite Liquor Solids | Lime Precipitation Yield of Chlorinated Product [1], Percent of Original Spent Sulfite Liquor Solids |
|---|---|
| 0 | 56 |
| 10 | 66 |
| 30 | 85 |
| 43 | 83 |

[1] Yield includes chlorine combined with spent sulfite liquor solids.

The data of Table 1 of Example IV shows that for chlorine usage up to about 30% of the spent sulfite liquor solids the cost of chlorine addition is compensated by an increased yield of product in amount approximately equal to the weight of chlorine added. Moreover, such chlorine addition gives an improved product. Furthermore, the table shows that the addition of more chlorine over the 30% figure does not provide additional yield.

In general, the chlorination can be conducted in diluted, i.e., in the spent sulfite liquor as received from the blow pit or in concentrated spent sulfite liquor.

Example V

The following examples are presented to show how different treatments of the spent sulfite liquor provide progressive, steady and positive improvement in spent sulfite liquor solids as demonstrated by their ability to decrease the viscosity and gels of lime base drilling muds. In these experiments a lime base mud was prepared as described hereinabove using a clay having a "yield value" of 45. In all cases the results involve the addition of 4 pounds of the powdered product per barrel of mud.

TABLE 1 OF EXAMPLE V.—PROGRESSIVE IMPROVEMENT IN EFFECTIVENESS[1] OF SPENT SULFITE LIQUOR PRODUCED BY DIFFERENT TREATMENTS

| Product | Description of Treatment | Lb./bbl. | I.G. | 10 Min | | |
|---|---|---|---|---|---|---|
| | | | | Visc. | Gel. | W.L. |
| 1 | Fermented Spent Sulfite Liquor | 4 | 100 | 29.0 | 250 | 21.9 |
| | | 6 | 10 | 13.5 | 100 | 21.8 |
| 2 | Spent Sulfite Liquor Treated with Alkali According to our U.S. Application Ser. No. 694,733. | 4 | 65 | 24.0 | 230 | 18.5 |
| | | 6 | 0 | 12.3 | 70 | 18.2 |
| 3 | Selected Fraction of Fermented Spent Sulfite Liquor Obtained by Alcohol-Water Fractionation. | 4 | 0 | 11.3 | 70 | 16.8 |
| | | 6 | 0 | 7.2 | 0 | 15.0 |
| 4 | Fermented Spent Sulfite Liquor Oxidized with 8% KMnO$_4$ and Dried. | 4 | 0 | 15.0 | 150 | 19.0 |
| | | 6 | 0 | 7.2 | 5 | (17.5) |
| 5 | Fermented Spent Sulfite Liquor Oxidized with 8% KMnO$_4$ and Recovered by Lime Precipitation. | 4 | 0 | 8.8 | 20 | 17.2 |
| | | 6 | 0 | 7.2 | 0 | 14.3 |

[1] In lime base muds.

Relative Product 1: The results are given for fermented spent sulfite liquor; Relative Product 2: An improvement in the behavior of the fermented spent sulfite liquor is indicated as attained by treating this material according to the process described in our copending application Serial No. 694,733, now Patent No. 3,007,910; Relative Product 3: On the other hand, fractionation of the fermented spent sulfite liquor as by organic solvents as set forth in Adolphson, et al., U.S. application Serial No. 437,833, filed June 18, 1954, and abandoned in favor of Serial No. 703,664, filed December 18, 1957, now abandoned, shows an even greater improvement in the mud treating properties of the product. However, this fraction represents only about 20% of the original total spent sulfite liquor solids; Relative Product 4: In definite and striking contrast, when the fermented spent sulfite liquor is treated (for one example) with 8% potassium permanganate according to the process herein set forth of our invention, substantially the whole of the spent sulfite liquor solids are converted into a product essentially equivalent to that of a fractionated product which is only 20% of the total fermented sulfite liquor solids. Thus a substantial improvement is made not only in chemical character, or properties, but also from the economical point of view, giving several times the yield of effective product; Relative Product 5: The results are given for a product which is made by purifying fermented sulfite liquor which has been oxidized with potassium permanganate, the process for the same being as follows: Fermented spent sulfite liquor containing 100 grams of solids in 1500 milliliters of solution was oxidized by adding a 5% solution, formed of 8 grams of potassium permanganate in water. The resulting oxidized product was precipitated by adding 20 grams of calcium hydroxide as a thin slurry in water to raise the pH to 11.2, and the precipitate was removed by centrifuging, then washed with clear lime water, mixed in water, and redissolved by adding sulfuric acid to develop pH 5.5 for the solution. This solution was filtered to remove calcium sulfate, and dried at 60° C. The yield of this product was 54%.

Example VI

This example illustrates the improvement in limed mud thinning obtained by fractionating the spent sulfite liquor and converting the various fractions of lignosulfonates by base exchanging to the iron, copper, chromium or aluminum salts according to our discovery and invention. The fractions used for this example were prepared by fractionating concentrated fermented calcium base spent sulfite liquor with ethyl alcohol. Ethyl alcohol was added to a quantity of concentrated calcium base spent sulfite liquor having 50% by weight of non-volatile solids with stirring until 57 volumes of alcohol had been added for each 43 volumes of water. The heavy viscous liquid phase which separated was collected and then washed in a countercurrent liquid-liquid extractor with an alcohol-water mixture having 57 parts by volume of ethyl alcohol and 43 parts by volume of water to remove most of the sugars and low molecular weight materials left in the viscous phase. The washed heavy viscous liquid phase containing 51.8% of the original spent sulfite liquor solids was diluted with water until it contained 70 parts by weight of water for each 30 parts by weight of non-volatile solids. Next ethyl alcohol was added slowly with stirring until the water-alcohol mixture contained 60% by volume of alcohol and the resulting heavy viscous liquid phase which separated, comprising 21% of the original spent sulfite liquor solids (Fraction No. 1 of Table 1 of Example VI) was removed and dried. Additional fractions were separated as heavy viscous liquid phases first by adding ethyl alcohol to raise the alcohol concentration to 64% by volume and then to 72% by volume of alcohol (Fractions Nos. 2 and 3 of Table 1 of Example VI). These fractions comprised 19% and 8% respectively of the original spent sulfite liquor solids. Fraction No. 4, comprising 3.8% of the original spent sulfite liquor solids, was recovered by evaporating the remaining fluid light liquid phase. The characteristics of the fractions are shown in Table 1 of Example VI.

Portions (25 g.) of the fractions were dissolved in 150 ml. of water and converted to the aluminum salts by adding 20% by weight of aluminum sulfate (5 g.) (17% Al$_2$O$_3$) dissolved in 25 ml. of water. The samples were neutralized by adding sodium hydroxide to pH 4, heated one hour at 85–90° C., centrifuged to remove calcium sulfate, and dried in a stream of air at 60° C.

The resulting aluminum salts of the fractions were tested for limed mud thinning in comparison with the calcium salts of these fractions. The mud tests were made as herein above described using a mud prepared by mixing 60 g. of a commercial drilling clay having a "yield value" of 45 barrels of 15 cp. mud per ton of clay with 325 ml. of water. The results are given in Table 2 of Example VI.

TABLE 1 OF EXAMPLE VI.—PROPERTIES OF LIGNOSULFONATE FRACTIONS

| Fraction No. | Diffusion Coefficient[1] (mm²/Day) | Residual Reducing Matter as Glucose (percent) |
|---|---|---|
| Unfractionated Fermented Spent Sulfite Liquor | 14.4 | 9.5 |
| 1 | 7.4 | 4.0 |
| 2 | 8.4 | 3.8 |
| 3 | 11.0 | 3.4 |
| 4 | 16.3 | 5.8 |

[1] The diffusion coefficients for this and the following examples were measured by the method of Felicetta, et al., Journal of American Chemical Society, vol. 71, page 2879, August 1949.

TABLE 2 OF EXAMPLE VI.—COMPARISON OF ALUMINUM SALTS OF LIGNOSULFONATE FRACTIONS[1] WITH CALCIUM SALTS FOR MUD THINNING
[Tests in limed mud at 4.0 lbs. per barrel]

| Sample | I.G. | Visc. | 10G | W.L. |
|---|---|---|---|---|
| Calcium Salt of Unfractionated Fermented Spent Sulfite Liquor | 100 | 29 | 250 | 21.9 |
| Aluminum Salt of Unfractionated Fermented Spent Sulfite Liquor | 10 | 15 | 150 | 18.0 |
| Calcium Salt of Fraction 1 | 0 | 16.0 | 100 | 15.3 |
| Aluminum Salt of Fraction 1 | 0 | 11.0 | 50 | 15.5 |
| Calcium Salt of Fraction 2 | 0 | 11.3 | 70 | 16.8 |
| Aluminum Salt of Fraction 2 | 0 | 9.0 | 25 | 16.7 |
| Calcium Salt of Fraction 3 | 20 | 13.8 | 130 | 16.7 |
| Aluminum Salt of Fraction 3 | 2 | 12.3 | 100 | 17.0 |
| Calcium Salt of Fraction 4 | 90 | 27.0 | 290 | 20.0 |
| Aluminum Salt of Fraction 4 | 50 | 17.5 | 200 | 19.5 |

[1] Prepared from fermented spent sulfite liquor.

Thus we have discovered that the improvements in thinning properties obtained by conversion to the aluminum, iron, copper or chromium salts are obtained as well for fractionated sulfonated lignin-containing material, and fractionation gives unexpectedly enhanced improvements.

*Example VII*

This example illustrates the improved drilling mud thinning properties reuslting from the use of an oxidized selected fraction of spent sulfite liquor as compared with using the whole spent sulfite liquor. By way of example and not limitation, an electrolyzed fraction of spent sulfite liquor and a fraction of electrolyzed spent sulfite liquor were compared with whole fermented spent sulfite liquor and electrolyzed whole fermented spent sulfite liquor as drilling mud thinners.

The samples were prepared as follows:

*Electrolyzed spent sulfite liquor.*—Concentrated fermented calcium base spent sulfite liquor was diluted to approximately 10% by weight of non-volatile solids, neutralized to pH 8.0 (from about 4–4.5) with sodium hydroxide, and electrolyzed between platinum electrodes at 50° C. using 0.2 ampere hour of direct current per gram of spent sulfite liquor solids. A portion of the product was dried in air at 60° C.

*High molecular weight fraction of electrolyzed spent sulfite liquor.*—A portion of the electrolyzed spent sulfite liquor described above, containing 100 g. of non-volatile solids, was evaporated to a concentration of 30% solids (333 g. total weights) and then 354 ml. of 95% ethanol was added with stirring. Solids separated in a phase which had the consistency of dough and were removed from the alcoholic solution, dissolved in water, and then dried in air at 60° C. This fraction contained 65% of the solids present before electrolysis.

*Electrolyzed high molecular weight fraction of spent sulfite liquor.*—Portions of Fractions 1 and 2, Table 1 of Example VI, were blended in the ratio of 21 parts of Fraction 1 and 19 parts of Fraction 2 to make a sample representative of the high molecular weight 40% of the spent sulfite liquor. This sample was treated with sodium hydroxide solution, raising the pH to 8.0, and was then electrolyzed between platinum electrodes with stirring at 50° C., using 0.2 ampere hour of direct current per gram of solids. The product was dried in air at 60° C.

These samples were tested as hereinbefore described for limed mud thinning. The results given in Table 1 of Example VII show that both the high molecular weight fraction of the electrolyzed fermented spent sulfite liquor and the electrolyzed high molecular weight fraction of spent sulfite liquor show substantially lower water loss and improved mud thinning over both fermented spent sulfite liquor and the electrolyzed whole fermented spent sulfite liquor.

TABLE 1 OF EXAMPLE VII.—LIMED MUD THINNING TEST RESULTS
[6.0 lbs./bbl. of sample in lime base mud[1] rolled 20 hours at 150° F.]

| Sample | Initial Gel | Yield Value | 10 Min. Gel. | API Water Loss |
|---|---|---|---|---|
| Fermented Calcium Base Spent Sulfite Liquor | 1.0 | 3.5 | 7.5 | 13.6 |
| Electrolyzed Fermented Calcium Base Spent Sulfite Liquor | 1.0 | 2.0 | 1.5 | 13.0 |
| Electrolyzed High Molecular Weight Fraction of Fermented Calcium Base Spent Sulfite Liquor | 1.0 | 0.5 | 1.0 | 12.6 |
| High Molecular Weight Fraction of Electrolyzed Fermented Calcium Base Spent Sulfite Liquor | 1.0 | 0 | 1.0 | 11.2 |

[1] Base mud without thinning is too thick to measure.

*Example VIII*

This example is to illustrate the improved drilling mud thinner properties of the iron salts of higher molecular weight lignosulfonate fractions obtained from fermented spent sulfite liquor as compared with the iron salt of the whole fermented spent sulfite liquor. By way of example and not limitation, the iron salts of the first three fractions of Example VI and of the whole fermented spent sulfite liquor were compared as thinners for "gyp" and fresh water muds.

The iron salts of the whole fermented spent sulfite liquor and of the individual fractions were prepared by neutralizing a solution of each having approximately 30% by weight of non-volatile solids to pH 8.5 with sodium hydroxide and immediately adding to each 20% of ferric sulfate (analysis 24.5% Fe) based on the non-volatile solids as a 25% solution. The mixtures were heated to 85–90° C. for one hour, centrifuged to remove calcium sulfate, and dried in air at 60° C. The pH of the products ranged from 4.3 to 5.0.

The samples were tested as thinners for fresh water and gyp muds as hereinbefore described. With reference to Table 1 of Example VIII, the three high molecular weight fractions are better thinners and produce lower water loss than the whole spent sulfite liquor. Lowest water loss is obtained with the highest molecular weight fraction (i.e., lowest diffusion coefficient) and the best thinning is obtained with Fraction 2. With reference to Table 2 of Example VIII, the iron salts of Fractions 1 and 2 show better thinning than the iron salt of the whole fermented spent sulfite liquor in fresh water mud and all three fractions show lower water loss.

TABLE 1 OF EXAMPLE VIII.—GYP MUD THINNING TEST RESULTS

[6.0 lbs./bbl. rolled 20 hrs. at 150° F., pH 8.2]

| Sample | Diffusion Coefficient mm.²/day | Initial Gel | Yield Value | 10 Min. Gel | API Water Loss |
|---|---|---|---|---|---|
| Base Gyp Mud | | 13.0 | 15.5 | 46.5 | 30.1 |
| Iron Salt of Whole Fermented Spent Sulfite Liquor | 14.4 | 1.5 | 10.0 | 16.0 | 17.4 |
| Iron Salt of Fraction 1 | 7.4 | 1.0 | 7.0 | 12.7 | 8.8 |
| Iron Salt of Fraction 2 | 8.4 | 1.0 | 6.5 | 11.5 | 10.1 |
| Iron Salt of Fraction 3 | 11.0 | 1.0 | 7.0 | 13.5 | 12.1 |

TABLE 2 OF EXAMPLE VIII.—FRESH WATER MUD THINNING TEST RESULTS

[2.0 lbs./bbl. rolled 20 hrs. at 150° F., pH 9.5]

| Sample | Diffusion Coefficient mm.²/day | Initial Gel | Yield Value | 10 Min. Gel | API Water Loss |
|---|---|---|---|---|---|
| Base Fresh Water Mud | | 20.0 | 34.0 | 62.0 | 13.3 |
| Iron Salt of Whole Fermented Spent Sulfite Liquor | 14.4 | 2.0 | 6.0 | 16.0 | 14.4 |
| Iron Salt of Fraction 1 | 7.4 | 1.5 | 5.0 | 13.5 | 13.0 |
| Iron Salt of Fraction 2 | 8.4 | 1.0 | 5.0 | 12.5 | 12.7 |
| Iron Salt of Fraction 3 | 11.0 | 1.0 | 6.0 | 16.0 | 13.4 |

*Example IX*

This example is to illustrate the improved drilling mud thinning properties obtained with the oxidized iron, copper, chromium, and aluminum salts of a high molecular weight fraction of spent sulfite liquor as compared with the corresponding oxidized salt of the whole spent sulfite liquor. By way of example and not limitation the iron and copper salts of a sodium permanganate oxidized high molecular weight fraction were compared with the iron and copper salts of sodium permanganate oxidized whole spent sulfite liquor for thinning in gyp and sea water muds.

The iron and copper salts of a sodium permanganate oxidized high molecular weight spent sulfite liquor fraction were prepared from a blend of 21 parts of Fraction 1 of Example VI and 19 parts of Fraction 2 of Example VI representing the highest molecular weight 40% of fermented calcium base spent sulfite liquor. Fifty gram samples of the blend were dissolved in water and oxidized by adding 2.5 grams of sodium permanganate as a 5% solution to each with vigorous stirring, and then heating to 80° C. The samples were then base exchanged to the iron and copper salts by adding 36 grams of 25% ferric sulfate and 60 grams of 25% $CuSO_4 \cdot 5H_2O$ respectively. The mixtures were then heated 1 hour at 85–90° C., centrifuged to remove calcium sulfate, and dried in air at 60° C. The products had a final pH of 4.6 and 4.5 respectively.

The iron and copper salts of sodium permanganate oxidized spent sulfite liquor were prepared from concentrated fermented calcium base spent sulfite liquor having 35% non-volatile solids by weight. The liquor was oxidized by adding 5% of sodium permanganate based on the spent sulfite liquor solids as a 10% solution with vigorous stirring and then heating to 80° C. To make the iron salt, a sample of oxidized liquor containing 100 grams of the original spent sulfite liquor solids were mixed with 72 grams of 25% ferric sulfate solution, neutralized to pH 3.1 by adding 16 grams of 10% sodium hydroxide and then heated 1 hour at 85–90° C. The hot mixture was centrifuged to remove calcium sulfate and dried in air at 60° C. Final pH 4.2. To make the copper salt a sample of the permanganate oxidized spent sulfite liquor containing 50 grams of the original spent sulfite liquor solids was base exchanged by adding 15 grams of $CuSO_4 \cdot 5H_2O$ dissolved in water. The mixture was heated 1 hour at 85–90° C., centrifuged to remove calcium sulfate, and dried in air at 60° C. The product had a pH of 3.6.

The samples were tested as thinners for gyp muds as hereinbefore described and as thinners for sea water muds at 9.0 lbs./bbl. and pH 9.5. The sea water mud was prepared by mixing 1600 grams of a commercial drilling clay having a yield value of 8 barrels of 15 cp. mud per ton of clay and 400 grams of a commercial drilling clay having a yield value of 95 barrels of 15 cp. mud per ton of clay into 5,200 ml. of sea water. The mud was then mixed in 500 ml. batches for 45 minutes on a Hamilton Beach "Drinkmaster" No. 30 mixer at high speed and then recombined and stored in a glass bottle until used.

With reference to Table I of Example IX, both the iron and copper salts of the oxidized fractions are substantially better than the corresponding salts of oxidized whole spent sulfite liquor for thinning gyp muds. With reference to Table 2 of Example IX, the iron and copper salts of the fraction are each substantially equally as effective as the corresponding oxidized salts of whole spent sulfite liquor for thinning sea water mud and far more effective for lowering water loss.

TABLE 1 OF EXAMPLE IX.—GYP MUD THINNING TEST RESULTS

[6.0 lbs./bbl. in gyp mud at pH 8.2, rolled 20 hrs. at 150° F.]

| Sample | Initial Gel | Yield Value | 10 Min. Gel | API Water Loss |
|---|---|---|---|---|
| Base Gyp Mud | 13.0 | 15.5 | 46.5 | 30.1 |
| Iron Salt of Permanganate Oxidized Spent Sulfite Liquor | 3.0 | 13.0 | 17.0 | 16.7 |
| Iron Salt of Permanganate Oxidized Fraction | 3.0 | 10.5 | 15.0 | 9.6 |
| Copper Salt of Permanganate Oxidized Spent Sulfite Liquor | 3.5 | 7.0 | 33.0 | 18.0 |
| Copper Salt of Permanganate Oxidized Fraction | 2.5 | 6.5 | 14.0 | 12.4 |

TABLE 2 OF EXAMPLE IX.—SEA WATER MUD THINNING TEST RESULTS

[9.0 lbs./bbl. in sea water mud at pH 9.5, rolled 20 hrs. at 150° F.]

| Sample | Initial Gel | Yield Value | 10 Min. Gel | API Water Loss |
|---|---|---|---|---|
| Base Sea Water Mud | 28.0 | 41.5 | 28.0 | 39.0 |
| Iron Salt of Permanganate Oxidized Spent Sulfite Liquor | 5.5 | 7.0 | 12.0 | 29.5 |
| Iron Salt of Permanganate Oxidized Fraction | 3.0 | 7.0 | 9.5 | 14.1 |
| Copper Salt of Permanganate Oxidized Spent Sulfite Liquor | 5.5 | 8.0 | 18.0 | 33.5 |
| Copper Salt of Permanganate Oxidized Fraction | 6.5 | 9.0 | 20.0 | 15.6 |

*Example X*

This example is to show the better mud thinner properties obtained with an oxidized iron salt of a selected lignosulfonate fraction of spent sulfite liquor as compared with the oxidized iron salt of the whole spent sulfite liquor.

The selected calcium lignosulfonate was the purified highest molecular weight 40% of a fermented spent sulfite liquor. For its preparation a fermented spent sulfite liquor was first concentrated to 50% by weight of non-volatile solids by evaporation at about 32° C. The concentrated spent sulfite liquor was mixed with ethyl alcohol to a solvent mixture of 60 volume percent alcohol and the resulting viscous heavy phase was separated from the fluid lighter phase. The heavy phase was next washed in a countercurrent liquid-liquid extractor with a 60% ethyl alcohol–40% water mixture to remove sugars and low molecular lignosulfonates and thus to yield a product heavy phase, the solids of which analyzed about 4% of total reducing substances calculated as glucose and constituted approximately 52% by weight of the original sulfite spent liquor solids. This product was diluted to 30% non-volatile solids with water and then fractionated into several fractions by adding ethyl alcohol and separating the resulting viscous heavy phases. The higher molecular weight fractions were blended to yield a sample representative of the highest molecular weight 40% of the original fermented spent sulfite liquor, hereinafter in this sample called the selected fraction.

The oxidized iron salt of the selected calcium lignosulfonate fraction was prepared as follows: 300 grams of solids of the selected fraction, free of alcohol and dissolved in about 500 grams of water, was mixed with 12 grams of sodium hydroxide added as a 25% solution and the mixture was digested for 20 hours at 85–95° C. in a hot water bath. The digestion product was converted to the iron salt by adding 45 grams of ferric sulfate (24% Fe) as a 25% solution in water. Next 21 grams of sodium dichromate dihydrate dissolved in 63 ml. of water was slowly added with vigorous stirring together with sulfuric acid to maintain the pH below about 3.0 (75 g. of 16% sulfuric acid). The mixture was digested 1 hour at 85–90° C., centrifuged to remove calcium sulfate and dried in air at 60° C. This product was tested for drilling mud thinning in comparison with the oxidized iron salt of fermented spent sulfite liquor prepared by the same procedure. Drilling mud tests comparisons were made in sea water mud and in gypsum base mud.

The sea water mud was prepared from commercial drilling clays and sea water taken from Puget Sound, as described in Example IX.

Drilling mud tests were made as hereinbefore described.

With reference to Table 1 of Example X, the mud test results in sea water mud show that the product prepared from the selected fraction of spent sulfite liquor is a better mud thinner than the product prepared from the whole spent sulfite liquor giving lower plastic viscosity, gels and water loss. A similar result was obtained with gypsum base mud, Table 2 of Example X, with plastic viscosity, gels and water loss lower for the selected fraction.

A thermal stability test of the products in gypsum base mud was made by heating the thinned muds in sealed stainless steel bombs for 20 hours at 350° F. The muds were then cooled, mixed 15 minutes at high speed and tested immediately. With reference to Table 3 of Example X, the product prepared from the selected fraction gave the lowest yield, gels and water loss in the thermally aged mud.

TABLE 1 OF EXAMPLE X.—SEA WATER MUD THINNING TEST RESULTS

[Mud tests at pH 9.5, rolled 20 hrs. at 150° F.]

| Sample | Lb./Bbl. | IG | PV | Y | 10G | WL |
|---|---|---|---|---|---|---|
| Oxidized Iron Salt of Spent Sulfite Liquor | 9.0 | 1.5 | 9.0 | 2.5 | 11.0 | 15.5 |
| | 12.0 | 1.0 | 7.0 | 2.5 | 8.5 | 6.2 |
| Oxidized Iron Salt of Fraction | 9.0 | 0.5 | 5.5 | 3.0 | 7.0 | 7.4 |
| | 12.0 | 0.5 | 5.0 | 2.5 | 4.5 | 4.0 |

TABLE 2 OF EXAMPLE X.—GYPSUM BASE MUD THINNING TEST RESULTS

[Mud tests at pH 8.2, rolled 20 hrs. at 150° F.]

| Sample | Lb./Bbl. | IG | PV | Y | 10G | WL |
|---|---|---|---|---|---|---|
| Oxidized Iron Salt of Spent Sulfite Liquor | 4.0 | 10.0 | 6.5 | 7.5 | 10.0 | 13.4 |
| | 6.0 | 0.5 | 7.5 | 4.0 | 10.0 | 11.0 |
| | 8.0 | 0 | 11.0 | 3.5 | 10.0 | 8.5 |
| Oxidized Iron Salt of Fraction | 4.0 | 1.0 | 5.5 | 5.0 | 7.5 | 10.7 |
| | 6.0 | 1.0 | 6.0 | 3.5 | 7.0 | 8.8 |
| | 8.0 | 0 | 6.5 | 3.0 | 5.5 | 5.8 |

TABLE 3 OF EXAMPLE X.—THERMAL STABILITY TEST IN GYPSUM BASE MUD

[Mud tests after rolling 20 hours at 350° F., pH 8.2, in sealed bomb]

| Sample | Lb./Bbl. | IG | PV | Y | 10G | WL |
|---|---|---|---|---|---|---|
| Oxidized Iron Salt of Spent Sulfite Liquor | 4.0 | 22.0 | 6.0 | 30.0 | 43.0 | 28.0 |
| Oxidized Iron Salt of Fraction | 4.0 | 7.0 | 6.0 | 13.0 | 19.0 | 22.8 |

*Example XI*

This example is to illustrate the thinning of drilling muds, which have been purposely contaminated with soluble calcium salts, by use of low molecular weight products of our invention prepared by fractionation of sulfonated lignin-containing materials. Soluble calcium salts such as calcium chloride are added to drilling muds when drilling "heaving shale" to inhibit hydration and swelling of the shale.

The samples used in this example were prepared from calcium lignosulfonate fractions obtained from spent sulfite liquor by fractionation with alcohol. Fermented spent sulfite liquor concentrated to about 30% solids was fractionated by adding ethyl alcohol until a substantial quantity of a heavy, viscous liquid phase separated. This heavy liquid phase was allowed to settle, then was drained off, and additional alcohol was added to cause separation of another viscous liquid phase containing calcium lignosulfonates of a lower average molecular weight than the first viscous liquid phase which separated. Three samples representing calcium lignosulfonates having a wide range of molecular weights as defined by the measured diffusion coefficients 7.4, 16.3 and 25 were selected from the product samples of a number of experimental fractionations carried out using the above procedure. The fractions were base exchanged to the iron salts by adding ferric sulfate equivalent to their calcium content and were oxidizide in water solution by adding 8% of sodium dichromate based on total soluble solids as a 25% solution with vigorous stirring. The product mixtures were neutralized to pH 3 to 4 by adding dilute sodium hydroxide, heated 1 hour at 85–90° C., centrifuged to remove calcium sulfate formed in the base exchange reaction, and dried at 60° C. for testing.

The product samples were tested for thinning of calcium contaminated mud using a mud prepared as herein above described with 45.5 lbs./bbl. of a mixture of commercial drilling clays comprising 6 parts by weight of a clay having a "yield value" of 45 barrels of 15 cp. mud per ton of clay and 1 part by weight of a clay having a "yield value" of 95 barrels of 15 cp. mud per ton of clay. Muds were prepared by adding 6 lb./bbl. of calcium chloride and 4 lb./bbl. of additive sample simultaneously to the mud, mixed 20 minutes, adjusted to pH 8.2 by adding sodium hydroxide, rolled overnight at room temperature and then 24 hours at 150° F. and tested for yield and and gels.

With reference to Table 1 of Example XI the mud test results show a progressive improvement (decrease) in yield and gels of the mud as the average molecular weight of the lignosulfonate decreased.

TABLE 1 OF EXAMPLE XI.—EFFECT OF MOLECULAR SIZE ON THINNING OF CaCl₂ CONTAMINATED MUD—MUD TESTS AT pH 8.2 WITH 6 LB./BBL. CaCl₂ AND 4 LB./BBL. THINNER

[Muds aged by rolling 24 hrs. at 150° F.]

| Diffusion Coefficient mm.²/Day | Initial Gel | Yield | 10 Min. Gel |
|---|---|---|---|
| 7.4 | 20.0 | 26.5 | 22.0 |
| 16.3 | 11.0 | 18.5 | 22.0 |
| 25 | 13.0 | 15.0 | 17.0 |

Low molecular weight lignosulfonates suitable for thinning calcium chloride mud can be obtained by any method of chemical fission of the lignosulfonate molecule such as by resulfonation, as well as by fractionation of the spent sulfite liquor.

The term "fractionation" and similar terms as applied to lignin-containing material herein are intended to mean and include, in addition to the lime fractionation and solvent fractionation methods disclosed herein, known methods of separating lignosulfonates or solutions thereof such as spent sulfite liquor into fractions of differing molecular weights, such known methods including dialysis, selective absorption or penetration processes using ion exchange resins, leather scrap, inorganic minerals, etc. The term "high molecular weight fraction" and similar terms are intended to mean and include fractions having an average molecular weight corresponding to a diffusion coefficient (as measured by the method of Felicetta et al., Journal American Chemical Society, vol. 71, page 2879, August 1949), of less than about 10. A "low molecular weight fraction" as used herein is one having an average molecular weight corresponding to a diffusion coefficient of greater than about 15. It will be understood to those skilled in the art that these values are selected from the standpoint of practical considerations and are only the approximations to indicate the relative orders of magnitude thereof.

By "purifying" herein is meant partially or completely removing the nonlignosulfonate portions of the spent sulfite liquor as by fermentation, lime precipitation in bulk, by salting out, or by reaction with organic amines and separation as precipitates or as non-miscible solutions; in short, by any of the methods known to the art. Particularly, "purifying" includes the removal of sulfur dioxide, otherwise unnecessary consumption of the oxidizing agent occurs. Such removal may be accomplished by steam stripping and/or air blowing and this particularly at elevated temperatures. "Purifying" may also include removal of insoluble inorganic precipitates such as calcium sulfite and sulfate. By "separating" the spent sulfite liquor solids is meant isolating in whole or in part the said solid components of the spent sulfite liquor by any of the methods herein disclosed. By "concentrating" the spent sulfite liquor solids is meant reducing the volatile content of the spent sulfite liquor in part or to the degree that there remain only the solid components of the spent sulfite liquor.

When the phrase, "adding to the spent sulfite liquor solid components" is used, the solids could be in the original solution or isolated by any of the methods herein mentioned or known to the art. When the statement is herein used "treating to form a salt having an element selected from the group consisting of iron, aluminum, chromium, and copper," it is intended, of course, to include combinations of said elements. Likewise, in the listing of the oxidizing agents, combinations of said agents where chemically feasible are included. When it is directed to "add to" or "treat spent sulfite liquor," it is intended to employ or treat said liquor substantially as received from the digester excepting that the temperature of the spent sulfite liquor may be as it is received from the digester or after the spent sulfite liquor is cooled.

Where fermented spent sulfite liquor was used, in the examples herein it was prepared from the effluent from the commercial production of ethyl alcohol by fermentation of spent sulfite liquor with bakers' yeast (*Saccharomyces cerevisiae*). In the fermentation process the spent sulfite liquor as it is received from the blow pit is stripped (distilled) with steam to remove sulfur dioxide, cooled to about 30° C., and neutralized to about pH 4.5 with lime. Bakers' yeast is then added to the neutralized spent sulfite liquor to ferment the hexose sugars present to alcohol. The fermentation lowers the reducing value of the spent sulfite liquor as measured by Fehling's solution from about 24 percent to about 10 percent expressed as glucose and based on the spent sulfite liquor solids. Yeast is recovered for reuse by centrifuging and the alcohol is removed from the fermented liquor by stripping with steam. The resultant liquor is the fermented spent sulfite liquor. This method of fermentation is disclosed more fully in United States Letters Patent No. 2,430,355, granted to Joseph L. McCarthy on November 4, 1947. Any method of fermentation which primarily utilized the carbohydrates may be used. The fermentation may be either anaerobic or aerobic by any of a number of microorganisms including bacteria and yeast of the Torula genus.

In using a gypsum base mud, the calcium sulfate may be added to the mud from the strata being drilled.

Where examples of substances are given it is to be understood the same is done by way of illustration and not limitation.

We claim:

1. A process for producing products from sulfonated lignin-containing material, comprising the steps of separating said material into at least two fractions of sulfonated lignin-containing material having different molecular weight characteristics, and forming a salt of the sulfonated lignin-containing material, said salt having a cation selected from the group consisting of iron, aluminum, chromium, copper and combinations thereof.

2. The process of claim 1 wherein said sulfonated lignin-containing material is obtained from spent sulfite liquor.

3. The process of claim 2 wherein said fractionation comprises removing some of the highest and some of the lowest molecular weight fractions.

4. The process of claim 2 wherein the cation is iron.

5. The process of claim 4 wherein the iron is present in an amount chemically equivalent to 1–50% of the sulfate salt thereof, based on the weight of the spent sulfite liquor solids.

6. The product of the process of claim 4.
7. The process of claim 2 wherein the cation is aluminum.
8. The product of the process of claim 7.
9. The process of claim 2 wherein the cation is chromium.
10. The product of the process of claim 9.
11. The process of claim 2 wherein the cation is copper.
12. The product of the process of claim 11.
13. A process for producing products from sulfonated lignin-containing material, comprising the steps of separating said material into at least two fractions of sulfonated lignin-containing material having different molecular weight characteristics; forming a salt of said material, said salt having a cation selected from the group consisting of iron, aluminum, chromium, copper and combinations thereof; and oxidizing said sulfonated lignin-containing material with an oxidizing agent having an oxidizing power stronger than an oxidation potential of about −1.3.
14. The product of the process of claim 13.
15. The process of claim 13 wherein said sulfonated lignin-containing material is obtained from spent sulfite liquor and wherein said oxidizing agent is selected from the group consisting of hydrogen peroxide, ozone, lead dioxide, chromic acid, chlorine, alkali and alkaline earth metal hypochlorites, alkali metal chromate, alkali metal permanganate, alkali metal persulfate, alkali metal perborate, and combinations thereof.
16. The process of claim 15 wherein the oxidizing agent is chlorine and wherein the chlorinated spent sulfite liquor is fractionated by incremental additions of lime to an aqueous solution of said chlorinated spent sulfite liquor.
17. The process of claim 15 wherein the salt is formed of a high molecular weight fraction.
18. The product of the process of claim 17.
19. The process of claim 17 wherein the cation is iron and the oxidizing agent is an alkali metal chromate.
20. The process of claim 19 wherein the separated fraction comprises about the highest molecular weight 40% of the spent sulfite liquor solids.
21. The process of claim 17 wherein the cation is chromium and the oxidizing agent is an alkali metal chromate.
22. The process of claim 15 wherein the salt is formed of a low molecular weight fraction.
23. The process of claim 22 wherein the oxidizing agent is an alkali metal chromate and the separated fraction has a diffusion coefficient of greater than about 15.
24. The process of claim 13 wherein said oxidizing step comprises electrolytic oxidation.
25. A process for producing products from sulfonated lignin-containing material, comprising the steps of separating said material into at least two fractions of sulfonated lignin-containing material having different molecular weight characteristics; and oxidizing the sulfonated lignin-containing material with an oxidizing agent having an oxidizing power stronger than an oxidation potential of about −1.3.
26. The process of claim 25 wherein said sulfonated lignin-containing material is obtained from spent sulfite liquor and wherein said oxidizing agent is selected from the group consisting of hydrogen peroxide, oxone, lead dioxide, chromic acid, chlorine, alkali and alkaline earth metal hypochlorites, alkali metal chromate, alkali metal permanganate, alkali metal persulfate, alkali metal perborate, and combinations thereof.
27. The product of the process of claim 26.
28. The process of claim 26 wherein a high molecular weight fraction is oxidized.
29. The process of claim 26 wherein the oxidizing agent is chlorine and wherein the chlorinated spent sulfite liquor is fractionated by incremental additions of lime to an aqueous solution of said chlorinated spent sulfite liquor.
30. The process of claim 25 wherein said oxidizing step comprises electrolytic oxidation.
31. A process for producing products from sulfonated lignin-containing material comprising the steps of chlorinating said sulfonated lignin-containing material; fractionating said sulfonated lignin-containing material into fractions having different average molecular weights; and separating a fraction of said fractionated material.
32. The process of claim 31 wherein the chlorinated sulfonated lignin-containing material contains about 43% by weight chlorine based on the weight of the sulfonated lignin-containing material solids.
33. The process of claim 31 wherein said chlorinated sulfonated lignin-containing material contains up to about 30% by weight chlorine based on the weight of the sulfonated lignin-containing material solids.
34. The process of claim 31 wherein said separated fraction comprises an intermediate molecular weight fraction from which the highest molecular weight fraction in an amount of about 16.7% by weight of the unfractionated sulfonated lignin-containing material solids and the lowest molecular weight fraction comprising about 16.9% by weight of the unfractionated lignin-containing material solids has been removed.
35. A process for producing products from sulfonated lignin-containing material comprising the steps of forming a salt of a sulfonated lignin-containing material, said salt having a cation selected from the group consisting of iron, aluminum, chromium, copper and mixtures thereof; fractionating said sulfonated lignin-containing material into at least two fractions having different average molecular weights; and separating a fraction of said fractionated material, said separated fraction being selected from the group consisting of low molecular weight fractions and intermediate molecular weight fractions.

References Cited by the Examiner

UNITED STATES PATENTS

| | | | |
|---|---|---|---|
| Re. 18,268 | 12/1931 | Howard | 260—124.3 |
| 1,958,624 | 5/1934 | Howard et al. | 260—124.3 |
| 2,491,436 | 12/1949 | Barnes | 252—8.5 |
| 2,865,906 | 12/1958 | Hoye | 260—124 |
| 2,935,473 | 5/1960 | King et al. | 252—8.5 |
| 2,935,504 | 5/1960 | King et al. | 260—124 |
| 3,087,923 | 4/1963 | King et al. | 260—124 |

CHARLES B. PARKER, *Primary Examiner.*

JULIUS GREENWALD, ABRAHAM H. WINKELSTEIN, *Examiners.*